United States Patent
Ponaka et al.

(10) Patent No.: US 11,677,585 B2
(45) Date of Patent: Jun. 13, 2023

(54) TRANSPARENT TCP CONNECTION TUNNELING WITH IP PACKET FILTERING

(71) Applicant: Citrix Systems, Inc., Fort Lauderdale, FL (US)

(72) Inventors: Vishnu Prateek Ponaka, Bengaluru (IN); Pradeep Gaikwad, Bengaluru (IN); Jateen Mittal, Bengaluru (IN); Mukul Agarwal, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/402,125

(22) Filed: Aug. 13, 2021

(65) Prior Publication Data
US 2023/0049690 A1 Feb. 16, 2023

(51) Int. Cl.
*H04L 12/46* (2006.01)

(52) U.S. Cl.
CPC ...... *H04L 12/4633* (2013.01); *H04L 12/4641* (2013.01); *H04L 2212/00* (2013.01)

(58) Field of Classification Search
None
See application file for complete search history.

(56) References Cited

U.S. PATENT DOCUMENTS

| | | | |
|---|---|---|---|
| 2013/0097600 A1* | 4/2013 | Cardona | G06F 9/45558 718/1 |
| 2018/0041613 A1* | 2/2018 | Lapidous | H04L 67/2876 |
| 2019/0173849 A1* | 6/2019 | Lapidous | H04L 67/56 |

* cited by examiner

*Primary Examiner* — Christine T Duong

(57) ABSTRACT

Described embodiments provide systems and methods for tunneling data packets to a server. A computing device can include a processor and a network interface. The processor is configured to execute a network service, a local application, and a virtual private network (VPN) application. The network service can receive a packet from the local application for transmission via a VPN tunnel, the packet comprising a source address of the computing device and a source port associated with the local application. The network service can determine that the packet matches a first tunnel filter. The network service can encapsulate, responsive to the determination that the packet matches the first tunnel filter, the packet with the header comprising a local-host destination address and a destination port associated with the VPN application. The network service can provide the encapsulated packet to the VPN application.

17 Claims, 9 Drawing Sheets

TRANSPARENT TCP CONNECTION TUNNELING WITH IP PACKET FILTERING

FIELD OF THE DISCLOSURE

The present application generally relates to managing network connections by filtering IP packets, including but not limited to systems and methods for tunneling TCP connections.

BACKGROUND

Secure Sockets Layer Virtual Private Networks ("SSL VPNs") provide secure remote access solutions for communication between clients and servers. Special client software may intercept network packets from other applications or an operating system, and encapsulate the intercepted packets for forwarding via a connection to a VPN server. In many implementations, the server expects a new connection from the client for each transport layer packet flow.

Packet interception at the data link layer (OSI layer 2) may require complex and convoluted network drivers (e.g. a deterministic network driver (DNE)), resulting in difficulties in debugging or modifying the driver. For example, merely adding IPv6 support to a layer 2 based network driver may introduce numerous kernel mode changes, and potentially system-crashing errors. Hence, in many implementations SSL VPN clients may be error-prone, difficult to maintain or enhance, and require extensive kernel mode modifications or reimplementation of the entire network stack to add or update features.

SUMMARY

Implementations of the systems and methods of this technical solution can utilize a Filtering Platform ("FP"), which may comprise application programming interfaces ("API") and/or system services, for creating network filtering applications and/or filtering data packets captured from one or more layers within the network stack. The FP can include both user mode and kernel mode APIs, executing on one or more layers of the network stack, such as the application layer and the data link layer. The FP can provide a method for developing callout drivers, which are kernel-mode drivers implementing one or more callouts. The FP can initiate or execute the callout functions when a client processes connections or packets. The callout drivers can access the transmission control protocol ("TCP") packets or internet protocol ("IP") packets while the network stack processes the data through various layers.

The systems and methods can use the APIs provided by the FP to map packets into the connection without adding an excessive amount of overhead and latency. Further, the APIs can be used to map packets into the connection without any compromise in security for the clients and servers. For instance, while the FP itself may not provide features to map packets into the connection, the systems and methods can leverage the APIs of the FP for developing a lightweight callout driver and intelligently modifying network packets headers. The systems and methods can capture and modify the network packets without reimplementing the network stack in neither the kernel-mode nor user mode. The FP can bounce the data packet processed through the network stack to one or more applications up through the various layers. For example, the FP can bounce packets from an original application to a VPN application for tunneling to a VPN server. In another example, the FP can bounce response packets from the VPN application to the original application.

For secure remote access, clients can tunnel packets of interest to a VPN server, which can be a gateway. Proprietary protocols can be used to handle different types of protocols for communicating with the gateway. The different types of protocols can include at least user datagram protocol ("UDP"), TCP, domain name system ("DNS"), or internet control message protocol ("ICMP"). While some protocols, including UDP, DNS, and ICMP, can be multiplexed in a single connection, new individual TCP connections should be sent on a unique connection to servers, as mandated by the protocol.

Clients can execute an application code to instantiate proprietary communication with the gateway server, such as the VPN server in this case. The client can use a device driver to capture packets of interest for tunneling to the gateway. The device driver can include or be the FP. The FP can bounce the captured packets to one or more applications executing on the client device, such as an original application or a VPN application. For instance, the FP can capture data packets from the original application and bounce the packets to the VPN application. The VPN application can obtain or gather the corresponding metadata of the captured packets used to tunnel the data to the gateway. Similarly, in response to the VPN application receiving a response from the gateway, the VPN application can send the response packets through the network stack to the FP. The FP can bounce the response packet to the original application to establish a connection with a server.

The systems and methods can use localhost communication to map IP packets into TCP connections. For example, the callout driver of the FP can intercept packets of interest and encapsulate the IP packets as UDP data to an application over localhost. The application can include at least a VPN application or an original application transmitting the IP packet. For TCP packets, the VPN application can decapsulate or mangle the IPs and ports inside the IP packets including the IP header or the TCP header. The VPN application can reinsert the packet back into the network stack, such that the original TCP connection can land on an application localhost listener. The application localhost listener can include at least a UDP listener and a TCP listener. Further, by inserting the packet back into the network stack, the original TCP connection can be linked with a corresponding server-side connection.

For the driver-side of the FP, the driver can capture packets from the localhost TCP listener of the VPN application and encapsulate the captured packets as UDP data. For example, the TCP listener can receive the captured packet including a response from the server via the gateway. The driver can transmit the UDP data encapsulated based on the captured packets to the VPN application. The VPN application can modify the IPs and ports to the original TCP connection. The VPN application can transmit the encapsulated modified packets down the various layers. The driver can capture the encapsulated modified packets and decapsulate the packets to determine the destination of the packet. The driver can reinsert the decapsulated packet into the network stack to provide a response from the gateway to the original application.

The systems and methods of this technical solution can be employed in any application to establish a secure communication channel with a server over a gateway. The systems and methods can redirect or bounce data packets processed by the network stack through various layers back to the application layer in a user mode. The systems and methods can execute an application for modifying the data packets for tunneling to a VPN server. The tunneling process can establish a secure communication channel between clients and servers. By using the FWP initiating the callout drivers, the systems and methods can modify data packets in the application layers instead of in the lower layers of the network stack, thereby minimizing changes in the kernel-mode and avoid reimplementing the network stack. Thus, the technical solution described herein can provide a lightweight kernel-mode driver to reduce the attack surface as kernel space executes with higher privileges, which can lead to potential impacts, such as blue-screen-of-death ("BSoD"). Further, the technical solution can reduce resource consumption by not requiring bookkeeping in the driver since all policies and packets processing occurs in the user mode, and avoiding re-implementation of the full TCP stack. Additionally, the technical solution can increase the reliability of the secure access solution by using the Operating System's ("OS") TCP or IP stack for obtaining connection information through performing deep packet inspection and increase tunneling performance with access to metadata of the data packets. Moreover, the technical solution enables the client to capture two-way traffic, which is not supported by the previous local network trace, and avoid network speed throttling, among other performance limitations.

In one aspect, this disclosure is directed to a method for filtering data packets for tunneling to a server. The method can include receiving by a network service executed by a processor of a computing device, a packet from an application executed by the processor for transmission via a virtual private network (VPN) tunnel. The packet can include a source address of the computing device and a source port associated with the application. The method can include determining, by the network service, that the packet matches a first tunnel filter. The method can include, responsive to the determination that the packet matches the first tunnel filter, encapsulating, by the network service, the packet with a header comprising a localhost destination address and a destination port associated with a local VPN application executed by the processor. The method can include providing, by the network service, the encapsulated packet to the local VPN application.

The method can include receiving, by the network service, a second packet from the local VPN application. The second packet can include an encapsulated header comprising a source address and a source port associated with the local VPN application. The method can include determining, by the network service, that the second packet matches a second tunnel filter. The method can include, responsive to the determination that the second packet matches the second tunnel filter, removing, by the network service, the encapsulated header from the second packet. The method can include providing, by the network service, the decapsulated second packet to the application. The local VPN application can transmit the encapsulated packet via the VPN tunnel to a remote computing device.

The method can include receiving an identification of the destination port from the local VPN application upon instantiation, by the processor, of the local VPN application. The method can include receiving, by the network service, a modified version of the TCP packet from the local VPN application comprising the localhost destination address and a second destination port associated with the local VPN application. The method can include removing, by the network service, the encapsulated header from the modified version of the TCP packet. The method can include providing, by the network service, the modified version of the TCP packet to the local VPN application via the second destination port. The encapsulated header can use a user datagram protocol (UDP). The packet can include a transport control protocol (TCP) packet.

The method can include receiving, by the network service from the local VPN application, a response packet to the modified version of the TCP packet. The response packet can include the localhost destination address and the destination port associated with the local VPN application. The method can include providing, by the network service, the response packet to the local VPN application. The method can include receiving, by the network service from the local VPN application, a modified version of the response packet comprising a second source port associated with the local VPN application. The method can include encapsulating, by the network service, the modified version of the response packet with the header comprising the localhost destination address and the destination port associated with the local VPN application. The method can include providing, by the network service, the encapsulated packet to the local VPN application, the local VPN application transmitting the encapsulated packet via the VPN tunnel to a remote computing device.

In another aspect, this disclosure is directed to a method for tunneling data packets to a server. The method can include establishing, by virtual private network (VPN) application executed by a processor of a computing device, a VPN tunnel with a remote computing device. The method can include identifying, by the VPN application to a network service executed by the processor, a first listening port and a packet filter policy. The method can include receiving, by the VPN application from the network service, a packet from a local application of the computing device encapsulated with a header comprising a localhost destination address and a destination port comprising the first listening port. The packet can be encapsulated and transmitted by the network service responsive to matching the packet filter policy. The method can include transmitting, by the VPN application, the encapsulated packet to the remote computing device via the VPN tunnel.

The method can include receiving, by the VPN application, a response packet via the VPN tunnel from the remote computing device, the response packet encapsulated with a header comprising a source port associated with the VPN application. The method can include providing, by the VPN application, the encapsulated response packet to the network service, the network service decapsulating the response packet and providing the decapsulated response packet to the local application of the computing device. The encapsulated header of the response packet can include the source port associated with the VPN application. The encapsulated header can use a user datagram protocol (UDP). The packet can include a transport control protocol (TCP) packet.

In another aspect, this disclosure is directed to a system for filtering data packets for tunneling to a server. The system can include a computing device comprising a processor and a network interface. The processor can be configured to execute a network service, a local application, and a virtual private network (VPN) application. The system can receive a packet from the local application for transmission via a VPN tunnel. The packet can include a source address of the computing device and a source port associated with the local application. The system can determine that the packet matches a first tunnel filter. Responsive to the determination that the packet matches the first tunnel filter, the system can encapsulate the packet with the header comprising a localhost destination address and a destination port associated with the VPN application. The system can provide the encapsulated packet to the VPN application.

The system can receive a second packet from the VPN application, the second packet including an encapsulated header comprising a source address and a source port associated with the VPN application. The system can determine that the second packet matches a second tunnel filter. Responsive to the determination that the second packet matches the second tunnel filter, the system can remove the encapsulated header from the second packet. The system can provide the decapsulated second packet to the local application. The VPN application can transmit the encapsulated packet via the VPN tunnel to a remote computing device.

The system can receive an identification of the destination port from the VPN application upon instantiation, by the processor, of the VPN application. The encapsulated header can use a user datagram protocol (UDP). The packet can include a transport control protocol (TCP) packet. The system can receive a modified version of the TCP packet from the VPN application comprising the localhost destination address and a second destination port associated with the VPN application. The system can remove the encapsulated header from the modified version of the TCP packet. The system can provide the modified version of the TCP packet to the VPN application via the second destination port.

These and other aspects and implementations are discussed in detail below. The foregoing information and the following detailed description include illustrative examples of various aspects and implementations, and provide an overview or framework for understanding the nature and character of the claimed aspects and implementations. This Summary is not intended to identify key features or essential features, nor is it intended to limit the scope of the claims included herewith. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
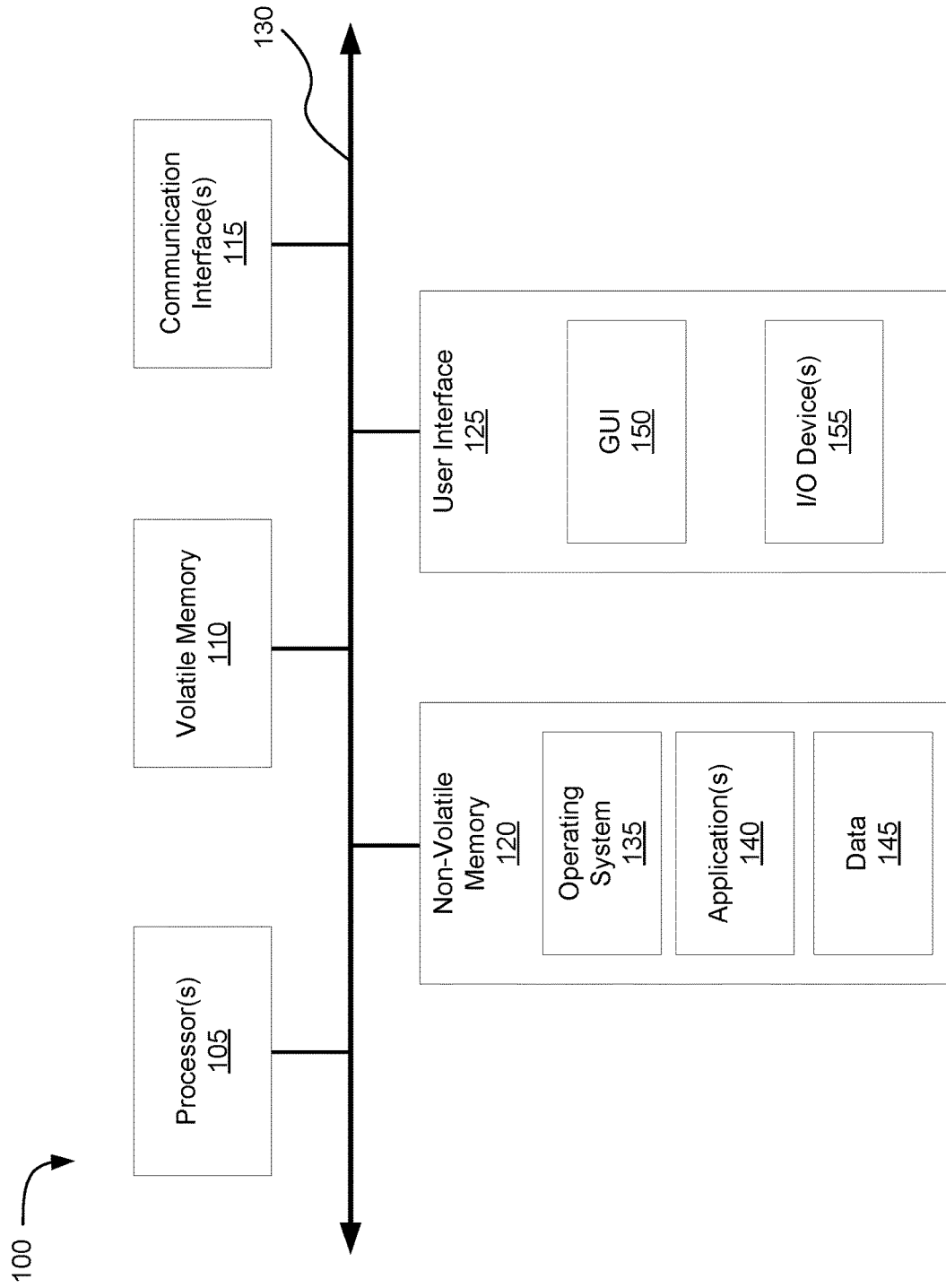
FIG. 1A is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes resource management services for managing and streamlining access by clients to resource feeds; and Section C describes systems and methods for tunneling data packets to a server.

A. Computing Environment

Prior to discussing the specifics of embodiments of the systems and methods of an appliance and/or client, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of one or more applications, one or more desktop applications, and one or more desktop sessions in which one or more applications may execute.

Figure 1B:
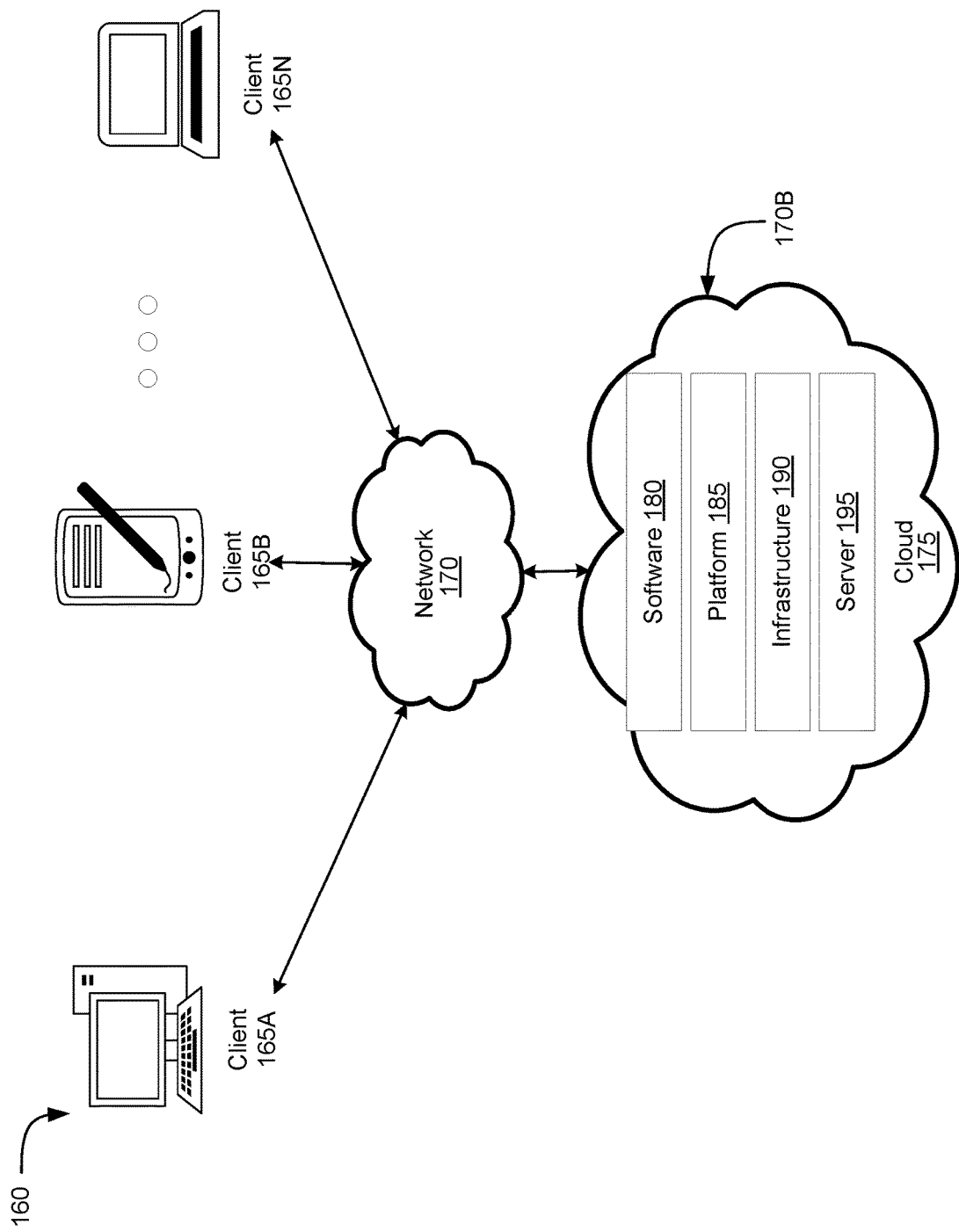
FIG. 1B is a block diagram depicting a computing environment comprising client device in communication with cloud service providers.

Referring to FIG. 1B, a computing environment 160 is depicted. Computing environment 160 may generally be implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing, or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but are not limited to, networks, network bandwidth, servers, processing, memory, storage, applications, virtual machines, databases, software, hardware, analytics, and intelligence.

In some embodiments, the computing environment 160 may provide client 165 with one or more resources provided by a network environment. The computing environment 160 may include one or more clients 165a-165n, in communication with a cloud 175 over one or more networks 170. Clients 165 may include, e.g., thick clients, thin clients, and zero clients. The cloud 108 may include back-end platforms, e.g., servers, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In some embodiments, the computing environment 160 can include a hybrid cloud that is a combination of a public cloud and a private cloud. For example, the cloud 175 may be public, private, or hybrid. Public clouds 108 may include public servers that are maintained by third parties to the clients 165 or the owners of the clients 165. The servers may be located off-site in remote geographical locations as disclosed above or otherwise. Public clouds 175 may be connected to the servers over a public network 170. Private clouds 175 may include private servers that are physically maintained by clients 165 or owners of clients 165. Private clouds 175 may be connected to the servers over a private network 170. Hybrid clouds 175 may include both the private and public networks 170 and servers.

The cloud 175 may include back-end platforms, e.g., servers, storage, server farms or data centers. For example, the cloud 175 can include or correspond to a server or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control, and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g., Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Wash.; RACKSPACE CLOUD provided by Rackspace US, Inc., of San Antonio, Tex.; Google Compute Engine provided by Google Inc. of Mountain View, Calif.; or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash.; Google App Engine provided by Google Inc.; and HEROKU provided by Heroku, Inc., of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc.; SALESFORCE provided by Salesforce.com Inc. of San Francisco, Calif.; or OFFICE 365 provided by Microsoft Corporation. Examples of SaaS may also include data storage providers, e.g., DROPBOX provided by Dropbox, Inc., of San Francisco, Calif.; Microsoft SKYDRIVE provided by Microsoft Corporation; Google Drive provided by Google Inc.; or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
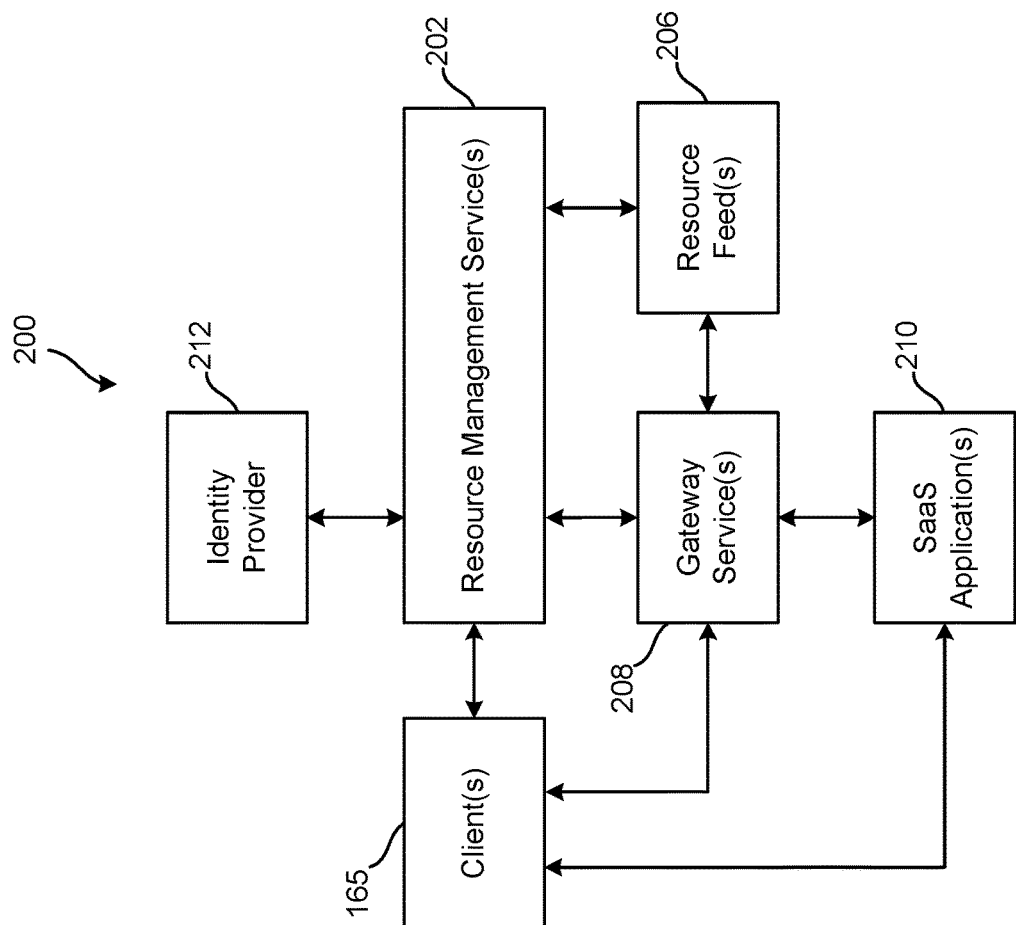
FIG. 2A is a block diagram of an example system in which resource management services may manage and streamline access by clients to resource feeds (via one or more gateway services) and/or software-as-a-service (SaaS) applications.

B. Resource Management Services for Managing and Streamlining Access by Clients to Resource Feeds FIG. 2A is a block diagram of an example system 200 in which one or more resource management services 202 may manage and streamline access by one or more clients 165 to one or more resource feeds 206 (via one or more gateway services 208) and/or one or more software-as-a-service (SaaS) applications 210. In particular, the resource management service(s) 202 may employ an identity provider 212 to authenticate the identity of a user of a client 165 and, following authentication, identify one of more resources the user is authorized to access. In response to the user selecting one of the identified resources, the resource management service(s) 202 may send appropriate access credentials to the requesting client 165, and the client 165 may then use those credentials to access the selected resource. For the resource feed(s) 206, the client 165 may use the supplied credentials to access the selected resource via a gateway service 208. For the SaaS application(s) 210, the client 165 may use the credentials to access the selected application directly.

The client(s) 165 may be any type of computing devices capable of accessing the resource feed(s) 206 and/or the SaaS application(s) 210, and may, for example, include a variety of desktop or laptop computers, smartphones, tablets, etc. The resource feed(s) 206 may include any of numerous resource types and may be provided from any of numerous locations. In some embodiments, for example, the resource feed(s) 206 may include one or more systems or services for providing virtual applications and/or desktops to the client(s) 165, one or more file repositories and/or file sharing systems, one or more secure browser services, one or more access control services for the SaaS applications 210, one or more management services for local applications on the client(s) 165, one or more internet enabled devices or sensors, etc. Each of the resource management service(s) 202, the resource feed(s) 206, the gateway service(s) 208, the SaaS application(s) 210, and the identity provider 212 may be located within an on-premises data center of an organization for which the system 200 is deployed, within one or more cloud computing environments, or elsewhere.

Figure 2B:
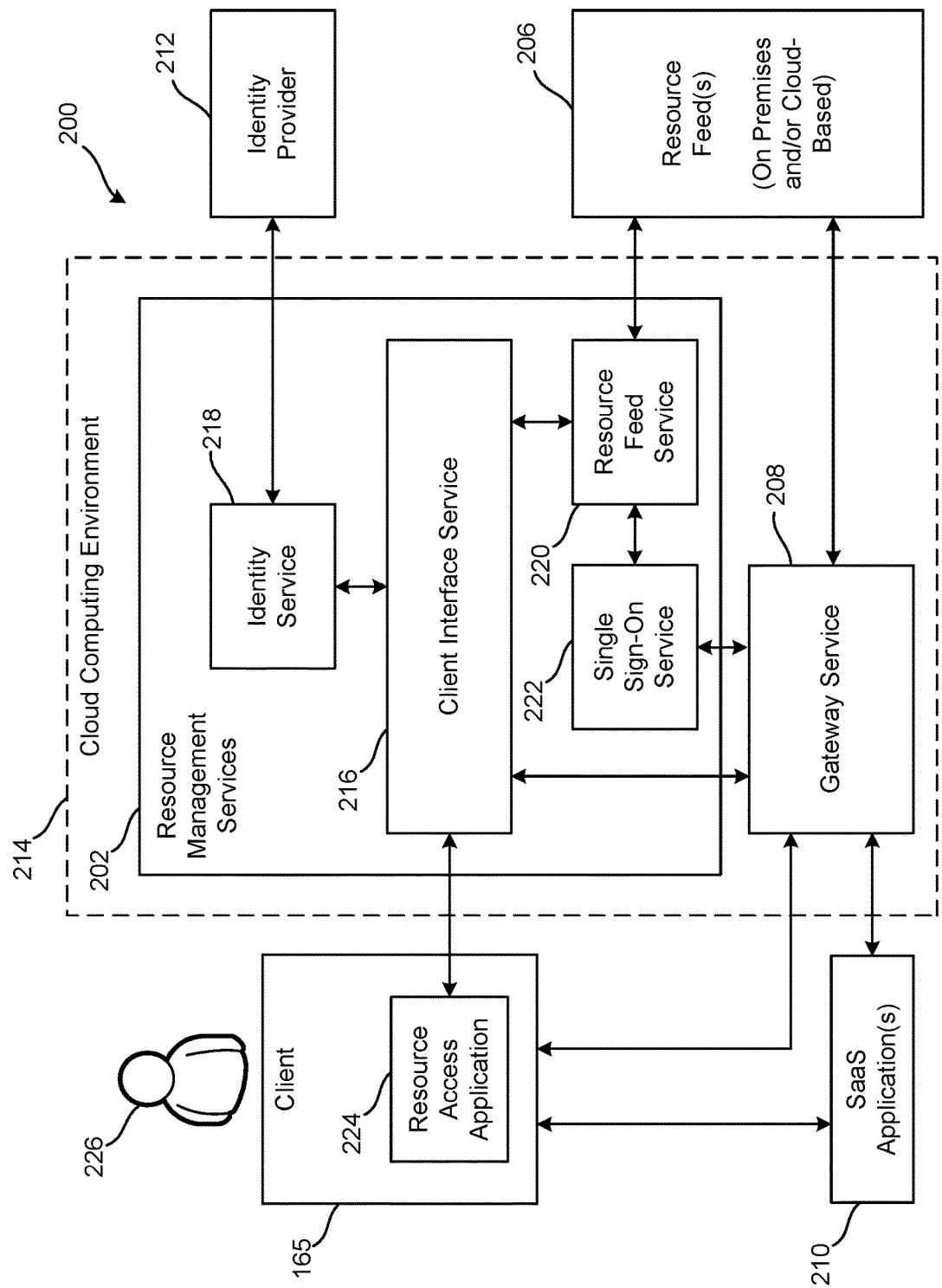
FIG. 2B is a block diagram showing an example implementation of the system shown in FIG. 2A in which various resource management services as well as a gateway service are located within a cloud computing environment.

FIG. 2B is a block diagram showing an example implementation of the system 200 shown in FIG. 2A in which various resource management services 202 as well as a gateway service 208 are located within a cloud computing environment 214. The cloud computing environment may, for example, include Microsoft Azure Cloud, Amazon Web Services, Google Cloud, or IBM Cloud.

For any of the illustrated components (other than the client 165) that are not based within the cloud computing environment 214, cloud connectors (not shown in FIG. 2B) may be used to interface those components with the cloud computing environment 214. Such cloud connectors may, for example, run on Windows Server instances hosted in resource locations and may create a reverse proxy to route traffic between the site(s) and the cloud computing environment 214. In the illustrated example, the cloud-based resource management services 202 include a client interface service 216, an identity service 218, a resource feed service 220, and a single sign-on service 222. As shown, in some embodiments, the client 165 may use a resource access application 224 to communicate with the client interface service 216 as well as to present a user interface on the client 165 that a user 226 can operate to access the resource feed(s) 206 and/or the SaaS application(s) 210. The resource access application 224 may either be installed on the client 165, or may be executed by the client interface service 216 (or elsewhere in the system 200) and accessed using a web browser (not shown in FIG. 2B) on the client 165.

As explained in more detail below, in some embodiments, the resource access application 224 and associated components may provide the user 226 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 224 is launched or otherwise accessed by the user 226, the client interface service 216 may send a sign-on request to the identity service 218. In some embodiments, the identity provider 212 may be located on the premises of the organization for which the system 200 is deployed. The identity provider 212 may, for example, correspond to an on-premises Windows Active Directory. In such embodiments, the identity provider 212 may be connected to the cloud-based identity service 218 using a cloud connector (not shown in FIG. 2B), as described above. Upon receiving a sign-on request, the identity service 218 may cause the resource access application 224 (via the client interface service 216) to prompt the user 226 for the user's authentication credentials (e.g., user-name and password). Upon receiving the user's authentication credentials, the client interface service 216 may pass the credentials along to the identity service 218, and the identity service 218 may, in turn, forward them to the identity provider 212 for authentication, for example, by comparing them against an Active Directory domain. Once the identity service 218 receives confirmation from the identity provider 212 that the user's identity has been properly authenticated, the client interface service 216 may send a request to the resource feed service 220 for a list of subscribed resources for the user 226.

In other embodiments (not illustrated in FIG. 2B), the identity provider 212 may be a cloud-based identity service, such as a Microsoft Azure Active Directory. In such embodiments, upon receiving a sign-on request from the client interface service 216, the identity service 218 may, via the client interface service 216, cause the client 165 to be redirected to the cloud-based identity service to complete an authentication process. The cloud-based identity service may then cause the client 165 to prompt the user 226 to enter the user's authentication credentials. Upon determining the user's identity has been properly authenticated, the cloud-based identity service may send a message to the resource access application 224 indicating the authentication attempt was successful, and the resource access application 224 may then inform the client interface service 216 of the successfully authentication. Once the identity service 218 receives confirmation from the client interface service 216 that the user's identity has been properly authenticated, the client interface service 216 may send a request to the resource feed service 220 for a list of subscribed resources for the user 226.

For each configured resource feed, the resource feed service 220 may request an identity token from the single sign-on service 222. The resource feed service 220 may then pass the feed-specific identity tokens it receives to the points of authentication for the respective resource feeds 206. Each resource feed 206 may then respond with a list of resources configured for the respective identity. The resource feed service 220 may then aggregate all items from the different feeds and forward them to the client interface service 216, which may cause the resource access application 224 to present a list of available resources on a user interface of the client 165. The list of available resources may, for example, be presented on the user interface of the client 165 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®), one or more secure browsers, one or more internet enabled devices or sensors, one or more local applications installed on the client 165, and/or one or more SaaS applications 210 to which the user 226 has subscribed. The lists of local applications and the SaaS applications 210 may, for example, be supplied by resource feeds 206 for respective services that manage which such applications are to be made available to the user 226 via the resource access application 224. Examples of SaaS applications 210 that may be managed and accessed as described herein include Microsoft Office 365 applications, SAP SaaS applications, Workday applications, etc.

For resources other than local applications and the SaaS application(s) 210, upon the user 226 selecting one of the listed available resources, the resource access application 224 may cause the client interface service 216 to forward a request for the specified resource to the resource feed service 220. In response to receiving such a request, the resource feed service 220 may request an identity token for the corresponding feed from the single sign-on service 222. The resource feed service 220 may then pass the identity token received from the single sign-on service 222 to the client interface service 216 where a launch ticket for the resource may be generated and sent to the resource access application 224. Upon receiving the launch ticket, the resource access application 224 may initiate a secure session to the gateway service 208 and present the launch ticket. When the gateway service 208 is presented with the launch ticket, it may initiate a secure session to the appropriate resource feed and present the identity token to that feed to seamlessly authenticate the user 226. Once the session initializes, the client 165 may proceed to access the selected resource.

When the user 226 selects a local application, the resource access application 224 may cause the selected local application to launch on the client 165. When the user 226 selects a SaaS application 210, the resource access application 224 may cause the client interface service 216 request a one-time uniform resource locator (URL) from the gateway service 208 as well as a preferred browser for use in accessing the SaaS application 210. After the gateway service 208 returns the one-time URL and identifies the preferred browser, the client interface service 216 may pass that information along to the resource access application 224. The client 165 may then launch the identified browser and initiate a connection to the gateway service 208. The gateway service 208 may then request an assertion from the single sign-on service 222. Upon receiving the assertion, the gateway service 208 may cause the identified browser on the client 165 to be redirected to the logon page for identified SaaS application 210 and present the assertion. The SaaS may then contact the gateway service 208 to validate the assertion and authenticate the user 226. Once the user has been authenticated, communication may occur directly between the identified browser and the selected SaaS application 210, thus allowing the user 226 to use the client 165 to access the selected SaaS application 210.

In some embodiments, the preferred browser identified by the gateway service 208 may be a specialized browser embedded in the resource access application 224 (when the resource application is installed on the client 165) or provided by one of the resource feeds 206 (when the resource application 224 is located remotely), e.g., via a secure browser service. In such embodiments, the SaaS applications 210 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (4) restricting navigation, e.g., by disabling the next and/or back browser buttons, (5) restricting downloads, e.g., by disabling the ability to download from within the SaaS application, and (6) displaying watermarks, e.g., by overlaying a screen-based watermark showing the username and IP address associated with the client 165 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 206) for assessment of its security risk by a web filtering service. For approved URLs, the specialized browser may be permitted to access the link. For suspicious links, however, the web filtering service may have the client interface service 216 send the link to a secure browser service, which may start a new virtual browser session with the client 165, and thus allow the user to access the potentially harmful linked content in a safe environment.

In some embodiments, in addition to or in lieu of providing the user 226 with a list of resources that are available to be accessed individually, as described above, the user 226 may instead be permitted to choose to access a streamlined feed of event notifications and/or available actions that may be taken with respect to events that are automatically detected with respect to one or more of the resources. This streamlined resource activity feed, which may be customized for each user 226, may allow users to monitor important activity involving all of their resources—SaaS applications, web applications, Windows applications, Linux applications, desktops, file repositories and/or file sharing systems, and other data through a single interface— without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 165 to notify a user 226 of something that requires the user's attention (e.g., approval of an expense report, new course available for registration, etc.).

Figure 2C:
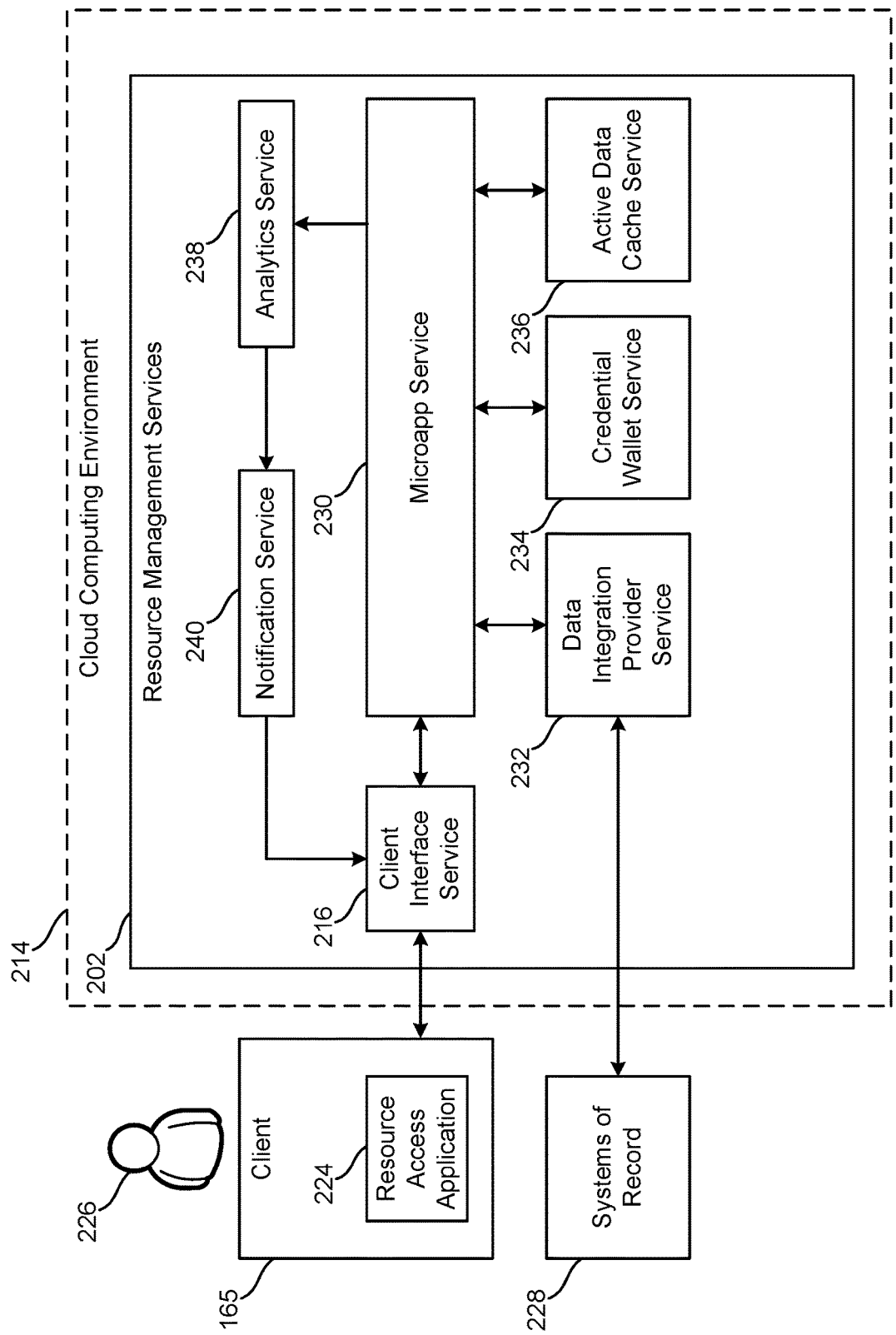
FIG. 2C is a block diagram similar to that shown in FIG. 2B but in which the available resources are represented by a single box labeled "systems of record," and further in which several different services are included among the resource management services.

FIG. 2C is a block diagram similar to that shown in FIG. 2B but in which the available resources (e.g., SaaS applications, web applications, Windows applications, Linux applications, desktops, file repositories and/or file sharing systems, and other data) are represented by a single box 228 labeled "systems of record," and further in which several different services are included within the resource management services block 202. As explained below, the services shown in FIG. 2C may enable the provision of a streamlined resource activity feed and/or notification process for a client 165. In the example shown, in addition to the client interface service 216 discussed above, the illustrated services include a microapp service 230, a data integration provider service 232, a credential wallet service 234, an active data cache service 236, an analytics service 238, and a notification service 240. In various embodiments, the services shown in FIG. 2C may be employed either in addition to or instead of the different services shown in FIG. 2B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 224 without having to launch the native application. The system shown in FIG. 2C may, for example, aggregate relevant notifications, tasks, and insights, and thereby give the user 226 a dynamic productivity tool. In some embodiments, the resource activity feed may be intelligently populated by utilizing machine learning and artificial intelligence (AI) algorithms. Further, in some implementations, microapps may be configured within the cloud computing environment 214, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 2C, the systems of record 228 may represent the applications and/or other resources the resource management services 202 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 202, and in particular the data integration provider service 232, may, for example, support REST API, JSON, OData-JSON, and 6ML. As explained in more detail below, the data integration provider service 232 may also write back to the systems of record, for example, using OAuth2 or a service account.

In some embodiments, the microapp service 230 may be a single-tenant service responsible for creating the microapps. The microapp service 230 may send raw events, pulled from the systems of record 228, to the analytics service 238 for processing. The microapp service may, for example, periodically pull active data from the systems of record 228.

In some embodiments, the active data cache service 236 may be single-tenant and may store all configuration information and microapp data. It may, for example, utilize a per-tenant database encryption key and per-tenant database credentials.

In some embodiments, the credential wallet service 234 may store encrypted service credentials for the systems of record 228 and user OAuth2 tokens.

In some embodiments, the data integration provider service 232 may interact with the systems of record 228 to decrypt end-user credentials and write back actions to the systems of record 228 under the identity of the end-user. The write-back actions may, for example, utilize a user's actual account to ensure all actions performed are compliant with data policies of the application or other resource being interacted with.

In some embodiments, the analytics service 238 may process the raw events received from the microapps service 230 to create targeted scored notifications and send such notifications to the notification service 240.

Finally, in some embodiments, the notification service 240 may process any notifications it receives from the analytics service 238. In some implementations, the notification service 240 may store the notifications in a database to be later served in a notification feed. In other embodiments, the notification service 240 may additionally or alternatively send the notifications out immediately to the client 165 as a push notification to the user 226.

In some embodiments, a process for synchronizing with the systems of record 228 and generating notifications may operate as follows. The microapp service 230 may retrieve encrypted service account credentials for the systems of record 228 from the credential wallet service 234 and request a sync with the data integration provider service 232. The data integration provider service 232 may then decrypt the service account credentials and use those credentials to retrieve data from the systems of record 228. The data integration provider service 232 may then stream the retrieved data to the microapp service 230. The microapp service 230 may store the received systems of record data in the active data cache service 236 and also send raw events to the analytics service 238. The analytics service 238 may create targeted scored notifications and send such notifications to the notification service 240. The notification service 240 may store the notifications in a database to be later served in a notification feed and/or may send the notifications out immediately to the client 165 as a push notification to the user 226.

In some embodiments, a process for processing a user-initiated action via a microapp may operate as follows. The client 165 may receive data from the microapp service 230 (via the client interface service 216) to render information corresponding to the microapp. The microapp service 230 may receive data from the active data cache service 236 to support that rendering. The user 226 may invoke an action from the microapp, causing the resource access application 224 to send that action to the microapp service 230 (via the client interface service 216). The microapp service 230 may then retrieve from the credential wallet service 234 an encrypted OAuth2 token for the system of record for which the action is to be invoked, and may send the action to the data integration provider service 232 together with the encrypted OAuth2 token. The data integration provider service 232 may then decrypt the OAuth2 token and write the action to the appropriate system of record under the identity of the user 226. The data integration provider service 232 may then read back changed data from the written-to system of record and send that changed data to the microapp service 230. The microapp service 232 may then update the active data cache service 236 with the updated data and cause a message to be sent to the resource access application 224 (via the client interface service 216) notifying the user 226 that the action was successfully completed.

In some embodiments, in addition to or in lieu of the functionality described above, the resource management services 202 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 202 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 202 may, for example, parse these requests and respond because they are integrated with multiple systems on the back end. In some embodiments, users may be able to interact with the virtual assistance through either the resource access application 224 or directly from another resource, such as Microsoft Teams. This feature may allow employees to work efficiently, stay organized, and delivered only the specific information they are looking for.

C. Systems and Methods for Tunneling Data Packets to a Server

Computing platforms can provide a layer 2 (data link layer of the OSI model) based network driver, such as a DNE driver, to capture data packets transmitted by client devices. However, the layer 2 based network driver can be convoluted, which can be difficult to debug and enhance due to operations within the lower layers of the network stack. For example, implementing IPv6 for data packets transmitted from clients to servers would include an excessive amount of changes to at least the data packets and the network stack in the kernel mode, which is prone to error. Hence, it can be challenging to develop a less error-prone client that is easy to maintain and enhance with minimal modification to the kernel mode without needing to reimplement the network stack.

The present disclosure is directed towards systems and methods for tunneling data packets to a server with IP packet filtering. The systems and methods of this technical solution can utilize a network Filtering Platform ("FP"), among other filtering platforms, which can include APIs in both the kernel mode and user mode. For example, in some implementations, the filtering platform may comprise the Windows Filtering Platform ("WFP") provided by Microsoft, Inc. The FP can provide a development platform for creating network filtering applications, filtering data packets captured from one or more layers within the network stack. The FP can include both user mode and kernel mode APIs, executing on one or more layers of the network stack, such as the application layer and the data link layer. The FP can provide a method for developing callout drivers, which are kernel-mode drivers implementing one or more callouts. The FP can initiate or execute the callout functions when a client processes connections or packets. The callout drivers can access the transmission control protocol ("TCP") packets or internet protocol ("IP") packets while the network stack processes the data through various layers.

The systems and methods can use the APIs provided by the FP to map packets into the connection without adding an excessive amount of overhead and latency. Further, the APIs can be used to map packets into the connection without any compromise in security for the clients and servers. For instance, while the FP itself does not provide features to map packets into the connection, the systems and methods can leverage the APIs of the FP for developing a lightweight callout driver and intelligently modifying network packets headers. The systems and methods can capture and modify the network packets without reimplementing the network stack in neither the kernel-mode nor user mode. The FP can bounce the data packet processed through the network stack to one or more applications up through the various layers. For example, the FP can bounce packets from an original application to a VPN application for tunneling to a VPN server. In another example, the FP can bounce response packets from the VPN application to the original application.

For secure remote access, clients can tunnel packets of interest to a VPN server, which can be a gateway. Proprietary protocols can be used to handle different types of protocols for communicating with the gateway. The different types of protocols can include at least user datagram protocol ("UDP"), TCP, domain name system ("DNS"), or internet control message protocol ("ICMP"). While some protocols, including UDP, DNS, and ICMP, can be multiplexed in a single connection, new individual TCP connections are frequently sent on a unique connection to servers.

Clients can execute an application code to instantiate proprietary communication with the gateway server, such as the VPN server in this case. The client can use a device driver to capture packets of interest for tunneling to the gateway. The device driver can include or be the FP. The FP can bounce the captured packets to one or more applications executing on the client device, such as an original application or a VPN application. For instance, the FP can capture data packets from the original application and bounce the packets to the VPN application. The VPN application can obtain or gather the corresponding metadata of the captured packets used to tunnel the data to the gateway. Similarly, in response to the VPN application receiving a response from the gateway, the VPN application can send the response packets through the network stack to the FP. The FP can bounce the response packet to the original application to establish a connection with a server.

The systems and methods can use localhost communication to map IP packets into TCP connections. For example, the callout driver of the FP can intercept packets of interest and encapsulate the IP packets as UDP data to an application over localhost. The application can include at least a VPN application or an original application transmitting the IP packet. For TCP packets, the VPN application can decapsulate or mangle the IPs and ports inside the IP packets including the IP header or the TCP header. The VPN application can reinsert the packet back into the network stack, such that the original TCP connection can land on an application localhost listener. The application localhost listener can include at least a UDP listener and a TCP listener. Further, by inserting the packet back into the network stack, the original TCP connection can be linked with a corresponding server-side connection.

For the driver-side of the FP, the driver can capture packets from the localhost TCP listener of the VPN application and encapsulate the captured packets as UDP data. For example, the TCP listener can receive the captured packet including a response from the server via the gateway. The driver can transmit the UDP data encapsulated based on the captured packets to the VPN application. The VPN application can modify the IPs and ports to the original TCP connection. The VPN application can transmit the encapsulated modified packets down the various layers. The driver can capture the encapsulated modified packets and decapsulate the packets to determine the destination of the packet. The driver can reinsert the decapsulated packet into the network stack to provide a response from the gateway to the original application.

The systems and methods of this technical solution can be employed in any application to establish a secure communication channel with a server over a gateway. The systems and methods can redirect or bounce data packets processed by the network stack through various layers back to the application layer in a user mode. The systems and methods can execute an application for modifying the data packets for tunneling to a VPN server. The tunneling process can establish a secure communication channel between clients and servers. By using the FWP initiating the callout drivers, the systems and methods can modify data packets in the application layers instead of in the lower layers of the network stack, thereby minimizing changes in the kernel-mode and avoid reimplementing the network stack. Thus, the technical solution described herein can provide a lightweight kernel-mode driver to reduce the attack surface as kernel space executes with higher privileges, which can lead to potential impacts, such as blue-screen-of-death ("BSoD"). Further, the technical solution can reduce resource consumption by not requiring bookkeeping in the driver since all policies and packets processing occurs in the user mode, and avoiding re-implementation of the full TCP stack. Additionally, the technical solution can increase the reliability of the secure access solution by using the Operating System's ("OS") TCP or IP stack for obtaining connection information through performing deep packet inspection and increase tunneling performance with access to metadata of the data packets. Moreover, the technical solution enables the client to capture two-way traffic, which is not supported by the previous local network trace, and avoid network speed throttling, among other performance limitations.

Figure 3:
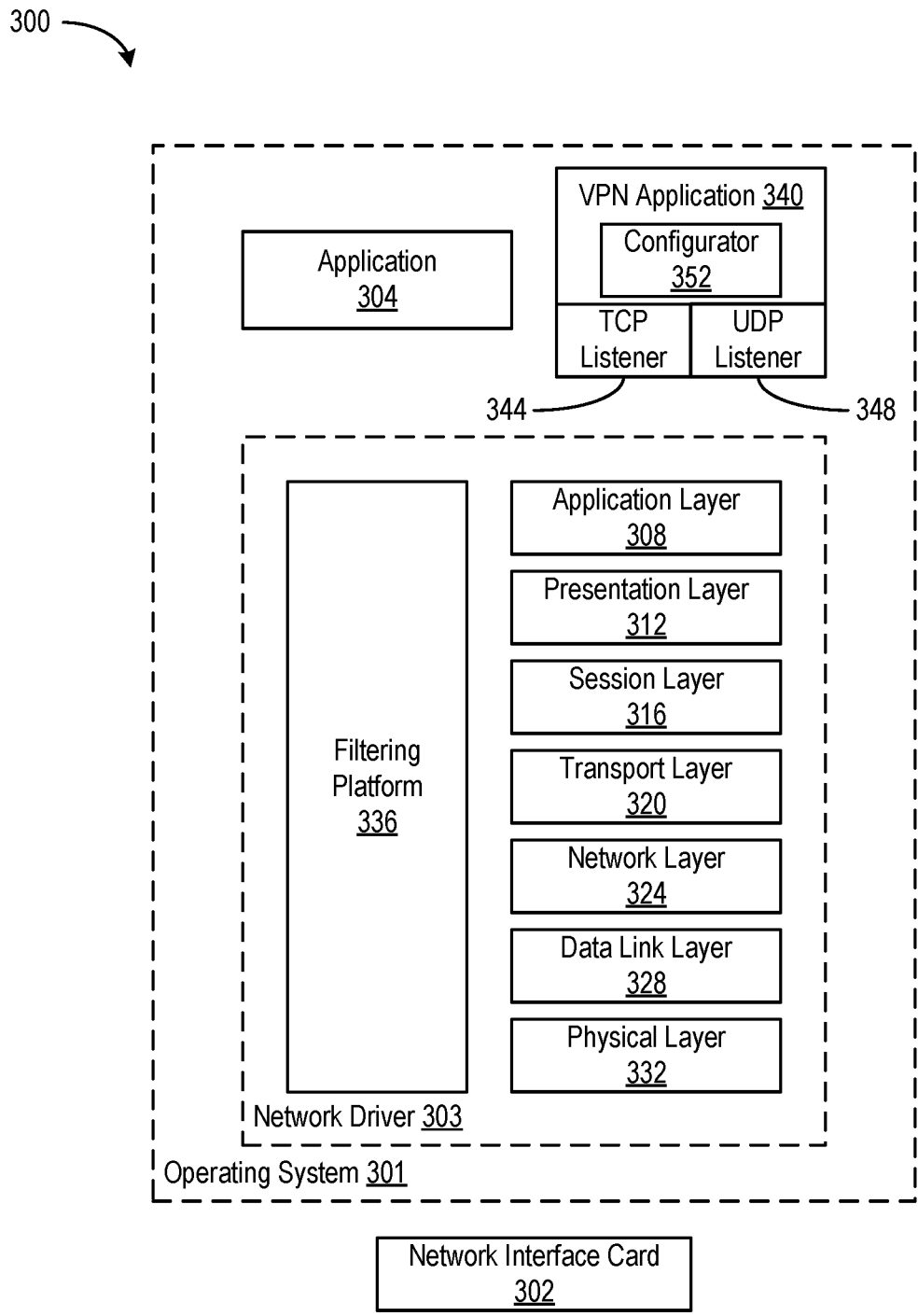
FIG. 3 is a block diagram of an example system for tunneling data packets to a server, in accordance with one or more implementations.

Referring to FIG. 3, depicted is a block diagram of one embodiment of a system 300 for tunneling data packets to a server. The system 300 can include or be a device (e.g., a client device), a computing device, or a data processing system ("DPS"). The system 300 can include or be composed of hardware, software, or a combination of hardware and software components. The system 300 can include at least an operating system 301 ("OS") and a network interface card 302 ("NIC"). The components of the system 300 including the OS 301 and the NIC 302 can be in electrical communication or interconnected with each other. For example, the OS 301 can transmit data packets to the NIC 302 for forwarding to one or more remote devices or remote servers. In another example, the NIC 302 may receive data packets from a remote device connected to or in a communication session with the OS 301. The NIC card 302 can relay the data packets received from the remote device to the OS 301.

The OS 301 can include at least one network driver 303, at least one application 304, and at least one VPN application 340. The network driver 303, application 304, and the VPN application 340 can be included in, be a part of, or be installed on the OS 301 of the system 300. The components of the OS 301 including the network driver 303, the application 304, and the VPN application 340 can be in electrical communication or interconnected with each other. For example, the network driver 303 can communicate or interact with the application 304 and the VPN application 340. The network driver 303 can process data received from the application 304 and the VPN application 340.

The OS 301 can be installed with a VPN plugin service (sometimes referred to generally as a VPN plugin or VPN service). The VPN plugin service can execute with a local system privilege or an administrator privilege. The VPN application 340 can communicate with the VPN plugin service over a secure communication channel. The secure communication channel can be a secure interprocess communication ("IPC") between the VPN application 340 can the VPN plugin service. For example, the OS 301 can establish the IPC communication through a named pipe, a service validating the callers' application name, and by using a code signing certificate. By establishing communication with the VPN plugin service, the VPN application 340 can gain or execute with administrator privilege to perform features, functionalities, and operations discussed herein to tunnel packets to a VPN server. The OS 301 can include, for example, the filtering platform ("FP") 336 of the network driver 303 or API, such as the Windows Filtering Platform ("WFP") provided by Microsoft, Inc., the VPN application 340, and the VPN plugin service as part of a Gateway client package for rerouting data packets and modifying the packets for tunneling to the gateway or the VPN server.

The network driver 303 can sometimes be referred to as a network driver interface specification ("NDIS"). The network driver 303 can be an API for the NIC 302, such that the application 304 or the VPN application 340 can interface with the NIC 302 to communicate with other servers. For example, the network driver 303 can control the interface between the system 300 can remote devices. The network driver 303 can determine the protocol used by the computer network to generate a unique identification for the OS 301 to use. The network driver 303 can process or convert data packets from remote devices to usable formats. Further, the network driver 303 can convert data from one or more applications 304 (or the VPN application 340) to bitstreams for transmission over the network via the NIC 302, for example.

The network driver 303 can include various layers and at least one API including, but not limited to an application layer 308, presentation layer 312, session layer 316, transport layer 320, network layer 324, data link layer 328, physical layer 332, and FP 336. The individual layers of the network driver 303 can be a part of a network stack, protocol stack, or an Open Systems Interconnection ("OSI") model. The OSI model can be used by the OS 301 to transfer data between the system 300 and other devices. The layers can be referred to as a first layer through a seventh layer, for example, the application layer 308 to the physical layer 332 can be referred to as the seventh layer to the first layer, respectively. The network driver 303 can process data from one or more applications 304 without bookkeeping nor store any state. The network driver 303 can leverage the FP 336 to perform the features or functionalities of data redirection and modification, such as changing the destination address or modifying the payload of data packets.

The components (e.g., application layer 308, presentation layer 312, session layer 316, transport layer 320, network layer 324, data link layer 328, physical layer 332, and FP 336) of the network driver 303 can intercommunicate with each other for processing data up or down the layers. For example, each layer can relay data with the subsequent level including the application layer 308 through the physical layer 332 for transmitting data packets to other components of the system 300 or remote devices. In another example, each layer can relay data with prior levels including the physical layer 332 through the application layer 308 for providing data packets to the application 304 or the VPN application 340.

The VPN server can include one or more ports including at least a TCP listener 344 port and at least a UDP listener 348 port. The VPN application 340 can sometimes be referred to as a VPN plugin application. In some cases, the VPN application 340 can be included as part of or be one of the applications 304. The VPN application 340 can include or be connected to a configurator 352. In some cases, the configurator 352 can be installed on the OS 301 as a separate component from the VPN application 340. The VPN application 340 can be connected to or communicate with other components (e.g., network driver 303 or application 304) of the OS 301. For example, the VPN application 340 can transmit data to the application 304 by transmitting data packets through the network driver 303. The network driver 303 can invoke, using the FP 336, a callout driver to reroute the data packets from the VPN application 340 to the application 304, for example. The VPN application 340 can use the ports, such as the TCP listener 344 or the UDP listener 348 ports, to receive TCP packets or UDP packets, respectively.

The NIC 302 can include, be a part of, or be referred to as a network adapter, local area network ("LAN") adapter, or physical network interface. The NIC 302 can be connected to or communicate with the OS 301. The NIC 302 can be a hardware component coupled, attached, or installed to the system 300. The NIC 302 can connect the system 300 to a network. The network can refer to the network 170 in conjunction with FIG. 1B, in communication with the cloud 175 or other remote devices. The NIC 302 can include one or more features or functionalities of a communication interface 115, such as in conjunction with FIG. 1A. The NIC 302 can transmit or receive data packets to or from other NICs of remote devices within a network. The NIC 302 can operate as part of or use the data link layer 328 or the physical layer 332 for communication with other computing devices. For example, the NIC 302 can be both a physical layer 332 and a data link layer 328 device providing access to a network medium and provide a low-level addressing system. The NIC 302 can interface with the network via a cable or wirelessly.

In some cases, the NIC 302 can include or be a part of an interface of the system 300. For example, the NIC 302 can be an interface including hardware, software, or a combination of hardware and software components to interface with the network. The NIC 302 can include features or functionalities similar to the communication interface 118 to interface with the aforementioned components, such as in conjunction with FIG. 1A. For example, the interface can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface can include at least a built-in network adapter, network interface card, PCMCIA network card, EXPRESSCARD network card, card bus network adapter, wireless network adapter, USB network adapter, modem, or any other device suitable for interfacing one or more devices within the network to any type of network capable of communication.

The application 304 can be included, installed on, or maintained on the system 300. The application 304 can include or be a web browser, embedded browser, local application (sometimes referred to as native application), web application, or a Software-as-a-Service ("SaaS") application. For example, the application 304 can include the SaaS application 210 in conjunction with at least FIGS. 2A-B. The application 304 can be a software component of the OS 301, sometimes referred to as a software application. The application 304 can be executed on the OS 301 with data from the application 304 managed by the VPN application 340. For example, the application 304 can interact directly with the application layer 308. The application 304 can communicate with or send data or resources to the application layer 308 for processing through the various layers of the network driver 303. Passing through the various layers, the data can be sent to the VPN application 340 by the FP 336 executing in the network driver 303.

The end-user of the system 300 can interact with a user interface ("UP") of the application 304 to access the resources of the application 304. The resources of the application 304 can be retrieved from a remote device including a remote data storage storing resources of the application 304. For example, the end-user can interact with an icon or link associated with the application 304. The application 304 can request the user to authenticate. The application 304 can transmit a request to access resources from one or more remote devices via the NIC 302. The request can be intercepted by the FP 336 for tunneling via the VPN application 340 executing on the OS 301. Responsive to transmitting the request to access the resources, the application 304 can receive a response from the remote device via the VPN application 340, thereby enabling the user to access the resources associated with the application 304 executing on the OS 301. Data communication between the OS 301 to other remote devices or between different applications (e.g., application 304 and VPN application 340) of the OS 301 can be processed through the network driver 303, such as the network stack.

The application layer 308 can be the seventh layer of the OSI model. The application layer 308 can be a part of the end-user services, providing the interface of one or more applications 304 to the user. The application layer 308 can specify or include the communication protocol and interface methods used by the hosts in a communication network. The application layer 308 can depend on the transport layer 320 to establish a communication channel or data transfer channel with other hosts. The application layer 308 can be used by one or more applications 304 or network applications as part of generating or constructing the data packets for transferring data packets to one or more servers.

For example, the application layer 308 can specify one or more protocols used by the application 304. The protocols can specify at least file transfer protocol ("FTP"), Hypertext Transfer Protocol ("HTTP"), HTTP Secure ("HTTPS"), simple mail transfer protocol ("SMTP"), simple network management protocol ("SNMP"), Telnet protocol, or network file system ("NFS"), among other protocols used by the application 304 for data transmission. The application layer 308 can describe or specify the protocol used by the application 304 or the VPN application 340. The application layer 308 can provide the data of the one or more applications 304 as a payload or body of the data packets.

The application layer 308 can communicate with the end-user and the application executing on the OS 301. The user can interface with the network using the application layer 308. The application layer 308 can forward data from the application or VPN application 340 to the subsequent layer (e.g., the presentation layer 312). In some cases, the application layer 308 can receive, obtain, or extract the data from a packet propagated up to the application by the presentation layer 312 or another lower layer.

The presentation layer 312 can be the sixth layer of the OSI model. The presentation layer 312 can be referred to or described as a syntax layer. The presentation layer 312 can receive data from the application layer 308. To support the application layer 308 for transferring the data, the presentation layer 312 can format the data to a machine-readable format. For example, the presentation layer 312 can translate the data from the application 304 to series of bits. The translation process can be from at least American Standard Code for Information Interchange ("ASCII") to Extended Binary Coded Decimal Interchange Code ("EBCDIC"), or vice versa. The presentation layer 312 can translate between other formats, such as JPEG, MPEG, TIFF, or Binary, among other formats. The presentation layer 312 can compress the data or reduce the number of bits by performing data compression, such as lossy or lossless. For example, the presentation layer 312 can use lossless compression to reduce file size without reducing the quality of the file. In another example, the presentation layer 312 can use lossy compression, which can reduce the file size further than the lossless compression by removing some data that may result in reduced quality of the file.

The presentation layer 312 can receive data from the session layer 316. For example, the presentation layer 312 can specify or describe how the data should be presented to the end-user. The presentation layer 312 can translate the data from the session layer 316 to a readable format for presentation at the application layer 308. In some cases, the presentation layer 312 can decompress the data for presentation to the end-user. The presentation layer 312 can perform data encryption for data transmission and data decryption for the received data. For instance, the presentation layer 312 can encrypt the data for forwarding to the session layer 316 and decrypt data received from the session layer 316. For encryption or decryption, the presentation layer 312 can use a Secure Sockets Layer ("SSL").

The session layer 316 can be the fifth layer of the OSI model. The session layer 316 can manage communication sessions between different devices, including opening and closing a session between application processes. The session layer 316 can include various APIs in establishing a communication session or channel between applications of different devices. The APIs can include at least a network basic input output system ("NetBIOS"), TCP/IP Sockets, or Remote Procedure Calls ("RPCs"), among other APIs. The session layer 316 can perform or check the authentication, authorization, manage files transferred between the OS 301 and one or more servers. For example, at the session layer 316, the server can request credentials from the user for authentication. Responsive to authenticating the user based on valid credentials, the server can determine whether the user is authorized to access the resource requested by the user. If the user is authorized, the session layer 316 can monitor files the user downloaded from the server via the application 304, such as associating the files from the server with the respective data packets received by the OS 301. For example, the session layer 316 can track the sources or files the data packets belong to and the destination of the data packets, such as to the application 304. The application 304, such as a web browser or SaaS application, can perform features or functionalities of at least one of the application layer 308, the presentation layer 312, or the session layer 316.

The transport layer 320 can be the fourth layer of the OSI model. The transport layer 320 can provide host-to-host communication services for applications 304. For example, the transport layer 320 can provide services including at least connection-oriented communication, reliability, flow control, and multiplexing. In connection-oriented communication, the transport layer 320 can establish a communication session or a semi-permanent connection with other devices or applications 304 before transmitting useful data, such as to ensure that the data can be transmitted correctly. The transport layer 320 can provide reliability by notifying the sender whether the data is delivered to the intended recipient.

The transport layer 320 can manage the control the flow or rate of data transmission. For example, the transport layer 320 can prevent fast senders from transmitting more data than the data buffer of the receiver can support. Hence, the transport layer 320 can prevent overrunning the buffer. In some cases, the transport layer 320 can improve efficiencies of data transmission by reducing buffer underrun, such as continuing to transmit data to recipients capable of supporting the traffic from client devices. The transport layer 320 can perform segmentation of the data by segmenting the data into multiple units. Each segment or unit can include at least a source port number, a destination port number, and a sequence number. The network can use the destination port number to determine a remote application for directing the data packet. The transport layer 320 can use the sequence number for reassembling the segments into the correct order before the segmentation. For example, the transport layer 320 can perform multiplexing (sometimes referred to as muxing) to reassemble the segments into the transmitted message or data. Further, the transport layer 320 can add checksums to each segment of the data to determine any data corruption or loss during transmission. Any data corruption can be notified to the sender.

The transport layer 320 can include one or more protocols, such as transmission control protocol ("TCP") or user datagram protocol ("UDP"). For example, the transport layer 320 can perform connection-oriented transmission using TCP. In another example, the transport layer 320 can provide connectionless transmission as a service performed using UDP. Using TCP, the OS 301 can receive feedback from the designated device or application upon receiving the data. By using UDP for data transmission, the OS 301 can transmit data to devices or applications without receiving feedback. The transport layer 320 can pass data to the network layer 324.

The network layer 324 can be the third layer of the OSI model. The network layer 324 can transmit data packets from one computer to another, such as from the system 300 to a remote device. The network layer 324 can perform logical addressing, path determination, and routing packets through one or more intermediary routers. For example, the network layer 324 can assign the IP addresses to each segment to generate or construct an IP packet. The IP addresses can include a source IP address for identifying the sender and a destination IP address identifying the recipient. The addressing of devices can be IPv4 or IPv6 to identify different devices on the network. When transmitting the data packet to the router, the router can use a mask along with the IP address to determine the destination host to route the data packet. The network layer 324 can use path determination to determine the best path for delivering data packets, such as Open Shortest Path First ("OSPF"), Border Gateway Protocol ("BGP"), or intermediate system to intermediate system ("IS-IS").

The data link layer 328 can be the second layer of the OSI model. The data link layer 328 can perform physical addressing. For example, the data link layer 328 can assign media access control ("MAC") addresses of the sender and receiver to the data packet. The data link layer 328 can form a frame including the data packet, the MAC addresses. The data link layer 328 can be installed, included, or embedded as software in the NIC 302. The data link layer 328 can facilitate the transport of the data from one entity or device to another via at least one media, such as cable, optical fiber, or wirelessly through the air. The data link layer 328 can allow other layers of the OSI model to access the media through framing. The data link layer 328 can add data to the head and tail of the data packet based on the type of media used to transmit the data packet to other devices.

The data link layer 328 can perform error detection and combine data bits into frames. Further, the data link layer 328 can perform MAC to avoid the collision of data from multiple devices transmitted to the same media. The data link layer 328 can detect errors by using the bits included in the tail of the data packet to perform a checksum, for example. In further example, the data link layer 328 can encapsulate data for transmission and decapsulate data for forwarding to the network layer 324.

The physical layer 332 can be the first layer of the OSI model. The physical layer 332 can include one or more devices or computer hardware components connecting the OS 301 or the system 300 to the network. The physical layer 332 can include, be, or be a part of the NIC 302 for transmitting data processed through the OSI model or network stack to other remote devices. For example, the physical layer 332 can receive one or more frames of the data from the data link layer 328. The frames can include source and destination MAC addresses included by the data link layer 328. Further, the frame can include a data packet constructed by the network layer 324. The constructed data packet can include a data segment from the transport layer 320. The physical layer 332 can convert the frames including binary sequences into signals for transmission over local media. For example, the physical layer 332 can convert the frames to electrical, optical, or radio signal.

The FP 336 can be installed on the OS 301 as part of the network driver 303. The FP 336 can include, be a part of, or be referred to as a network service executed by a processor of the system 300. The FP 336 can include, be, or be a part of a callout driver. The FP 336 can receive instructions from the network driver 303 to invoke callouts, among other features. For example, the FP 336 can invoke a callout to capture or intercept at least one of the segments, data packets, or frames processed through the various layers of the OSI model. Further, the FP 336 can invoke callouts to perform features or functionalities discussed herein.

The FP 336 can communicate with any of the layers within the network driver 303, such as to intercept or capture data packets processed through the one or more layers. The FP 336 can be a development platform executing in both the kernel mode and the user mode. The FP 336 can provide APIs for managing data packets filtered from the various layers. The FP 336 can include various modules. For example, the FP 336 can include a classify function and a worker thread. The classify function can be called by the Networking Stack in response to or when receiving packets of interest. The packets of interest can include any data packets processed through the network stack that match the filter configured by the administrator of the VPN application 340, for example.

The FP 336 can retrieve the filter information from the configurator 352 of the VPN application 340. The FP 336 can invoke or execute the worker thread to manipulate the data packets. For example, the FP 336 can replace, manipulate, or configure the headers of the data packet including the destination address and the source address of the packet. In another example, the FP 336 can invoke the worker thread to configure the payload or body of the data packet. In some cases, the FP 336 can identify an existing connection between at least one application 304 and the server, where the application 304 is configured to be tunneled by the VPN application 340. The FP 336 can be implemented with a kill switch to terminate the existing connection responsive to receiving a configuration from the configurator 352. The configuration can identify at least one source port of one or more data packets to intercept. In some implementations, other components of the OS 301 can terminate the existing connection, such as the application 304 or the VPN application 340.

The FP 336 can execute the classify function module for intercepting packets for loopback. For example, the FP 336 can provide data packets from the network stack to the classify function. The classify function can determine whether a source port of the packet is the same as the listener port of the VPN application 340. If the source port matches the listener port based on the configuration of the filter, the classify function can insert the data packet in a queue of the worker thread module. The classify function can signal or notify the worker thread to retrieve the data packet in the queue. Otherwise, if the source port does not match the listener port, the FP 336 may insert the data packet back into the network stack for processing and forwarding to the destination address. In some cases, the FP 336 can forward the data packets to the destination address. For other loopback packets, the FP 336 can set one or more callout actions to continue processing the data packets, such as modifying data packets, reinserting data packets into the network stack, etc.

The FP 336 can execute the worker thread module to perform lookback on data packets filtered by the classify function module. For example, the worker thread can wait for signals from the classify function indicating a packet in the queue. The worker thread can retrieve and read the packet from the queue. The worker thread can retrieve the packets in any order from the queue, such as first come first serve ("FCFS"), last come first serve ("LCFS"), etc. The worker thread can determine whether the packet retrieves from the queue is a lookback or a non-loopback packet. For example, the loopback packet can include a packet that the FP 336 received from the VPN application 340. The packet can be a response packet for the VPN server or a gateway, for example. In another example, the non-loopback packet can include a packet the FP 336 received from the application 304 configured to be transmitted to the VPN application 340. In this example, the non-loopback packet can include any packet from the application 304 that has not been modified or send to the VPN application 340. In another example, the worker thread can determine whether the packet is a loopback or a non-loopback packet based on the configurations from the configurator 352 or the signal indicating the type of packet from the classify function module.

For non-loopback packets, the worker thread can encapsulate the data packet in another loopback having a UDP type with the destination port as the UDP listener 348 of the VPN application 340. Encapsulating the data packet can generate another data packet with the modified header, such as having the source port set to the FP 336 and the destination port as one of the listener ports (e.g., TCP listener 344 or UDP listener 348) of the VPN application 340. For example, with packets from the application 304, the worker thread can encapsulate the packet destined for the UDP listener 348. The worker thread can reinsert the packet back into the network stack in response to the encapsulation. For loopback packets, the worker thread can determine whether the packet is a type of TCP packet and whether the source port is a TCP listener 344.

If the packet type is TCP and the source port is TCP listener 344, the worker thread can encapsulate the packet in a loopback IP packet having a type UDP. The worker thread can configure the destination port of the loopback IP packet to the UDP listener 348 port. For other packets that are not of type TCP or without source port of TCP listener 344, the worker thread can decapsulate the packet retrieved from the queue. By decapsulating the packet, the worker thread can obtain or determine the data (e.g., UDP data) of the packet which can include another IP packet that was encapsulated in the retrieved packet. Accordingly, the worker thread can insert the packet from the decapsulated packet from the VPN application 340 into the network stack. The features and functionalities performed by the classify function module and worker thread module can be performed generally by the FP 336. For example, the classify function module and the worker thread module can perform features and functionalities performed by the FP 336 discussed herein.

The FP 336 can execute or operate with the VPN application 340 and the VPN service (e.g., VPN plugin service) to tunnel packets to the VPN server. For example, the FP 336 can receive a packet from the application 304. The packet can be configured to transmit to a server via a VPN tunnel. The packet can include at least a source address and a source port. The source address can include the source IP address associated with the system 300 (e.g., the computing device executing the application 304 to transmit the packet). The source port can be associated with the application 304 that provided the data for the packet.

The FP 336 can determine whether the packet matches a filter (sometimes referred to as a tunnel filter). The FP 336 can receive, obtain, or be installed with the filter rules or configuration from the VPN application 340. For example, the VPN application 340 can retrieve the filter rules from the VPN server, where the VPN service can install the filter rules on the FP 336. The FP 336 can indicate packets to capture based on at least the source port or the source address included in the individual packets. Capturing a packet can refer to intercepting the packet for processing, for example. In some cases, the FP 336 can determine that the packet matches the filter.

Responsive to the determination, the FP 336 can encapsulate the packet. The process of encapsulating the packet can include the FP 336 generating a new header for the packet. The header can include at least a localhost destination address and a destination associated with the local VPN application 340. The FP 336 can provide a header with either the TCP listener 344 port or the UDP listener 348 port as the destination port of the captured packet. Encapsulating a packet can include or refer to inserting the information from the IP packet, such as the original source port, source address, destination port, destination address, and the payload, to the payload of the encapsulated packet. In some implementations, the FP 336 can construct a different packet by inputting the new header and providing the original IP packet as the payload.

By inserting the encapsulated payload back into the network stack, the network stack can process and deliver the packet to the appropriate destination port. For example, the FP 336 can encapsulate the packet with an encapsulated header using a UDP type. In this case, the FP 336 can insert the encapsulated packet into the network stack, which can be forwarded to the UDP listener 348 port of the VPN application 340. In another case, if the header includes a TCP type, the FP 336 can insert the packet into the network stack, which can be forwarded to the TCP listener 344 port of the VPN application 340. In these cases, the destination address can be set to the local host.

The FP 336 can receive the identification of the destination port from the VPN application 340 or the VPN service. For example, the VPN application 340 can transmit information indicating the communication port of the VPN application 340 to the VPN service. The FP 336 can receive information from the VPN service indicating the communication ports (e.g., destination port or source port) of the VPN application 340. The FP 336 can receive the identification of the ports of the VPN application 340 in response to or upon instantiation of the VPN application 340 by the OS 301. For example, on boot-up, installation, or the initiation of the VPN application 340 by the OS 301, the VPN application 340 can transmit the identification of the ports to the VPN service to forward to the FP 336. By providing the ports to the FP 336, the FP 336 can communicate with the VPN application 340 via the provided ports.

Subsequent to receiving the packet and encapsulating the packet, the FP 336 can provide the encapsulated packet to the VPN application 340 by inserting the encapsulated packet in the network stack. For example, by inserting the encapsulated packet into the network stack, the layers of the network stack can process the packet and deliver the packet to the VPN application 340 based on the destination port and the destination address.

The FP 336 can filter other data packets based on the filter rules or configurations provided by the VPN server via the VPN application 340. For example, the filter rules can include at least one of destination IP address, such as OUTBOUND_NETWORK_LAYER, source IP address, destination port, or source port configured to be tunneled via the VPN server. The configuration set by the VPN server can be modified, added, removed, or otherwise configured by the administrator of the VPN server. Hence, the FP 336 can capture any traffic generated by the application 304 that includes a destination address, among other information, provided or matched in the filter rules.

The FP 336 can receive a response packet from the VPN application 340. For example, the VPN application 340 can process the packet received from the FP 336. The VPN application 340 can tunnel the packet to the VPN server for handling the request or traffic from the application 304. The VPN application 340 can receive a response from the VPN server. Accordingly, the VPN application 340 can transmit the response to the FP 336. The FP 336 can receive a response packet from the VPN server forwarded by the VPN application 340. The response packet can be referred to as a second packet, where the first packet is the packet from the application 304, for example.

The FP 336 can receive the response packet including the encapsulated header having a source address and a source port associated with the VPN application 340. The source address and the source port of the VPN application 340 can be a part of the filtering rule. For example, the FP 336 can determine that the second packet matches a second tunnel filter based on at least one of the source address or the source port of the packet. Accordingly, the FP 336 can capture the packet from the VPN application 340 for processing. Other types of packets captured by the FP 336 can be based on at least one information of the packet matching the filtering rule indicated by the VPN server.

The FP 336 can remove the encapsulated header from the second packet in response to determining that at least a portion of the header or other information of the second packet matches the filter. The filter for the response packet can be a second filter different from or similar to a first filter for capturing the packet from the application 304. The FP 336 can remove the encapsulated header by extracting the payload from the encapsulated packet. Removing the encapsulated header and extracting the payload can be parts of the decapsulation process of the encapsulated packet. The payload can include a packet, such as a packet including a different destination address and destination port, etc.

The FP 336 can provide the decapsulated packet (e.g., decapsulated second packet) to the application 304. For example, the decapsulated packet can include the destination port and destination address associated the application 304. The FP 336 can insert the decapsulated packet into the network stack for processing through the various layers. Accordingly, based on the destination port and destination address, the decapsulated packet can be provided to the application 304. The above process for encapsulation and decapsulation of the packet can be performed for various different types of packets, including a UDP packet, IP packet, ICMP packet, etc.

In some cases, the packet can include or be a TCP packet. The FP 336 can process the TCP packet by performing one or more operations as discussed above. In some cases, the FP 336 can process the TCP packet differently or with additional steps from the above operations. For example, the FP 336 can capture the TCP packet (e.g., referred to herein generally as a packet) based on the filter rules or the configurations. The FP 336 can encapsulate the packet into a UDP packet. For example, the FP 336 can insert the packet as the payload of the UDP packet. The UDP packet can include a destination address of the local host and a destination port of the UDP listener 348. The VPN application 340 can process and modify the UDP packet received from the FP 336. The VPN application 340 can respond to the FP 336 with a modified packet.

In response or subsequent to transmitting the UDP packet, the FP 336 can receive a modified packet from the UDP listener 348 of the VPN application 340. The modified packet can include or refer to a modified version of the TCP packet received from the VPN application 340. The modified packet can include a localhost destination address and a destination port associated with the VPN application 340. In this case, the modified packet can include the TCP listener 344 port as the destination port. The modified packet can include or be a part of an encapsulated packet received by the FP 336. For example, the FP 336 can decapsulate and fetch the modified packet from the encapsulated packet received from the VPN application 340. To decapsulate, the FP 336 can remove the encapsulated header from the modified version of the TCP packet. Hence, the FP 336 can fetch the modified TCP packet including the TCP listener 344 port as the destination port.

The FP 336 can insert the modified version of the TCP packet into the network stack. By inserting into the network stack, the FP 336 can provide the modified TCP packet to the VPN application 340 via the TCP listener 344 port based on the destination port identified in the header of the packet. In some implementations, the UDP listener 348 port can be referred to as a first destination port, and the TCP listener 344 port can be referred to as a second destination port. In some cases, the destination port and the source port can be interchangeable based on whether the VPN application 340 is receiving or transmitting packets, for example. The VPN application 340 can transmit the modified TCP packet to the remote computing device, such as a VPN server, via a VPN tunnel established between the VPN application 340 and the VPN server using a socket. The socket of the VPN server can be created or obtained based on or connected to at least one of the ports (e.g., TCP listener 344 port or UDP listener 348 port) of the VPN application 340 and the backend IP address of the OS 301.

In further example of TCP packet, the FP 336 can receive a response packet from the VPN application 340. The FP 336 can receive the response packet from the VPN application 340 via the TCP listener 344 port. The response packet can be in response to the modified version of the TCP packet. The response packet can include at least a localhost destination address and a destination port associated with the VPN application 340. For example, the destination port of the response packet can include or be the UDP listener 348 port. The FP 336 can provide the response packet to the VPN application 340 (e.g., the UDP listener 348) in response to receiving the response packet from the TCP listener 344. In some cases, the response packet may not include the UDP listener 348 port as the destination port. In this case, in response to receiving any packet (e.g., response packet) from the TCP listener 344, the FP 336 can encapsulate the response packet having the UDP listener 348 as the destination port and the localhost as the destination address.

Subsequent to transmitting the encapsulated response packet to the VPN application 340, the FP 336 can receive a modified response packet from the VPN application 340. For example, the VPN application 340 can modify the response packet to generate or provide the modified response packet to the FP 336. The FP 336 can receive the modified version of the response packet including a modified header. The VPN application 340 can modify the header with a different source port, such as a second source port associated with the VPN application 340. In this case, the source port can include or be the UDP listener 348 port of the VPN application 340.

In some implementations, the FP 336 can encapsulate the modified response packet (e.g., a modified version of the response packet) with a different header. The encapsulated modified response can include a header having the localhost as the destination address and a destination port associated with the VPN application 340, such as the TCP listener 344 port. For example, the FP 336 can provide the encapsulated modified response to the VPN application 340 by inserting the encapsulated modified response into the network stack. In this case, the VPN application 340 can be configured to transmit the encapsulated packet to a remote computing device via a VPN tunnel.

In some implementations, the modified response packet from the VPN application 340 can include or be the encapsulated modified response packet. For example, the FP 336 can transmit the encapsulated response packet to the UDP listener 348 port, where the VPN application 340 can modify the response packet. The FP 336 can receive the encapsulated modified response packet from the UDP listener 348 port in response to modifying the response packet. The FP 336 can decapsulate the modified response packet from the encapsulated header. The modified response packet can include a different header from the original response packet directed to the VPN application 340 from the VPN server. For example, the modified response packet can include a destination address of localhost and a destination port associated with the application 304. In further example, the VPN application 340 can modify the source address and the source port of the modified response packet to the respective destination address and destination port of the original TCP packet from the application 304. Hence, the process for tunneling packets from the application 304 can be seamless to the application 304, as the application 304 can receive a response identifying the destination server as the source of the response packet, for example.

The VPN application 340 can include at least one TCP listener 344 port, at least one UDP listener 348 port, and at least one configurator 352. The configurator 352 can be a component of the VPN application 340 configured to modify packets received from the FP 336. In some cases, the configurator 352 can provide the configuration or filter rules to the FP 336 via the VPN service. The features, functionalities, or operations performed by the configurator 352 can be referred to generally as features, functionalities, or operations performed by the VPN application 340. Further, operations of any component of the VPN application 340 (e.g., TCP listener 344 or UDP listener 348) can be referred to generally as operations of the VPN application 340. The configurator 352 of the VPN application 340 can perform features or functionalities of packet modification discussed herein. For example, the configurator 352 can encapsulate, decapsulate, process, and modify packets received by the VPN application 340. Further, the configurator 352 can modify the IP addresses and ports for the encapsulated header or the encapsulated packet.

The VPN application 340 can establish a connection with a remote computing device, such as a VPN server for forwarding data to other devices with the network. The connection established between the VPN application 340 and the VPN server can be referred to as a VPN tunnel for direct communication with the VPN server. To establish the connection, the VPN application 340 can create a socket on a free port or unregistered port. Creating a socket on a free port can refer to creating the socket and binding the created socket to a free port. For example, the VPN application 340 can create the socket for communication with the network driver 303 or the FP 336 of the network driver 303. The socket for communicating with the network driver 303 can be referred to as a UDP listener 348 socket.

The VPN application 340 can create a socket for maintaining TCP connections. The VPN application 340 can bind the created socket to another free port. The socket for maintaining the TCP connections can be referred to as a TCP listener 344 socket. In some cases, the listener sockets can be referred to as listener ports of the VPN application 340. In some cases, the VPN application 340 can bind another socket to a free port used as a source port for communicating UDP packets between the network driver 303 and the VPN application 340. In other cases, the VPN application 340 can use the UDP listener 348 port to communicate UDP packets between the network driver 303 and the VPN application 340. The VPN application 340 can communicate with at least the network driver 303 and the VPN server via one or more ports or sockets.

The VPN application 340 can identify a listening port. For example, the VPN application 340 can identify or determine a listening port for communication with the FP 336. The VPN application 340 can provide or communicate the ports to VPN service (sometimes referred to as privileged VPN service or VPN plugin service with administrator privilege). The VPN application 340 can communicate with the VPN service through a named pipe. The named pipe can include or be a part of a one-way or duplex pipe for communication between the components of the OS 301. The VPN service can relay the information from the VPN application 340 to the network driver 303 including the FP 336. The VPN service can relay the information to the network driver 303 over an input-output control ("IOCTL"). The IOCTL can include or refer to a system call for device-specific input or output operations, among other operations for transferring information between the memory of the system 300 and other hardware or software components. Accordingly, the VPN application 340 can provide or identify the listening port to the FP 336 for communicating data to the VPN application 340.

The VPN application 340 can identify a packet filter policy. The packet filter policy can sometimes be referred to as a filter rule or a configuration. The VPN application 340 can receive the packet filter policy from the VPN server. The filter policy can be configured by the administrator of the VPN server or other servers having the destination included in the packet. The VPN application 340 can install the filter policy on the FP 336. For example, the VPN application 340 can transmit the filter policy to the VPN service. The VPN service can relay the filter policy for installation on the network driver 303. The filter policy can be used by the FP 336 for capturing packets of interest. The filter policy can include or indicate at least the destination IP address to capture and tunnel. The filter policy can include other addresses (or ports in some cases) configured to be tunneled. Further, the filter policy can include a localhost-based filter rule at OUTBOUND_NETWORK_LAYER. The outbound network layer can refer to connections that are going out to a remote computing device. By providing the filter policy to the FP 336, responsive to receiving packets that match the filter rules, the FP 336 can invoke a callout driver code to capture and loop to the VPN application 340.

The VPN application 340 can receive a packet from at least one local application (e.g., application 304) of the OS 301. The VPN application 340 can receive the packet captured and encapsulated by the FP 336. The packet can include or be an encapsulated UDP packet inserted into the network stack by the FP 336. The encapsulated header of the UDP packet can include the localhost as the destination address and one of the ports as the destination port, such as the UDP listener 348 port. In this case, the encapsulated header can use a UDP. Further, the UDP listener 348 port can be referred to as the first listening port, in view of the previous example or description. The VPN application 340 can receive the encapsulated packet transmitted by the FP 336 in response to the FP 336 matching the packet from the application 304 to a filter policy.

The VPN application 340 can transmit the encapsulated packet to a remote computing device in response to receiving the encapsulated packet from the FP 336. The VPN application 340 can transmit the encapsulated packet, among other packets, to the VPN server via a VPN tunnel. For example, the VPN application 340 can perform a check on the source port of the packet to check or determine that the source port of the encapsulated packet is not from any random user-mode process. The FP 336 can configure the encapsulated header with a source port created by the VPN application 340 for UDP packet transmission between the VPN application 340 and the network driver 303. The VPN application 340 may ignore or disregard one or more packets having a source port indicating other user-mode processes.

In further example, the VPN tunnel established between the VPN application 340 and the VPN server by connecting at least one of the ports of the VPN application 340 to one of the ports of the VPN server. The VPN application 340 can tunnel other traffics from the application 304 to the VPN server upon receipt from the FP 336. The encapsulated packet from the VPN application 340 to the VPN server may not be captured by the FP 336 as the destination address can be associated with the VPN server. At least one of the destination address or the destination port associated with the VPN server may not be included in the filter policy. The VPN application 340 can perform the above operations for any type of packets, such as UDP packets, IP packets, etc. The VPN application 340 can perform other or additional operations discussed herein based on the content or types of packets, such as synchronization ("SYN") packets, synchronization-acknowledgment ("SYN-ACK") packets, encapsulated packets, or other types of packet either from the FP 336 or the VPN server.

The VPN application 340 can receive a response packet from the remote computing device via the VPN tunnel. The VPN application 340 can encapsulate the response packet with an encapsulated header. The encapsulated header can include at least a source port associated with the VPN application 340. The source port can be either a UDP listener 348 port or a TCP listener 344 port, among other ports associated with the VPN application 340. Further, the VPN application 340 can include the destination address and the destination port associated with the application 304. In some cases, the VPN application 340 can modify the source or the destination address of the response packet within the encapsulated header. Accordingly, the VPN application 340 can provide the encapsulated response packet to the FP 336 by inserting the packet into the network stack. The FP 336 can decapsulate the encapsulated response packet and insert the response packet into the network stack to provide the response to the application 304. In this case, the application 304 can receive a response packet including a source address and source port associated with the server handling the traffic from the application 304. The destination address and the destination port can be directed to or associated with the application 304.

In some implementations, the packet can include or be a TCP packet. For example, the FP 336 can receive a TCP packet from the application 304. The FP 336 can encapsulate the TCP packet in a different UDP packet destinated for the UDP listener 348 of the VPN application 340. Depending on the type of packet, either using the UDP header to the TCP header, the VPN application 340 can receive the packet at the UDP listener 348 port or the TCP listener 344 port, respectively. The VPN application 340 can process or modify individual packets differently based on the type of packet, such as SYN packets from the application 304 or SYN-ACK packet from the VPN server. Operations of the VPN application 340 can be discussed in further detail or in addition to the features or functionalities described above in at least FIGS. 4-6. In some implementations, the features, functionalities, or operations of the components (e.g., application 304, FP 336, VPN application 340, VPN service, etc.) of the OS 301 can be further described in conjunction with at least FIGS. 4-6.

Figure 4:
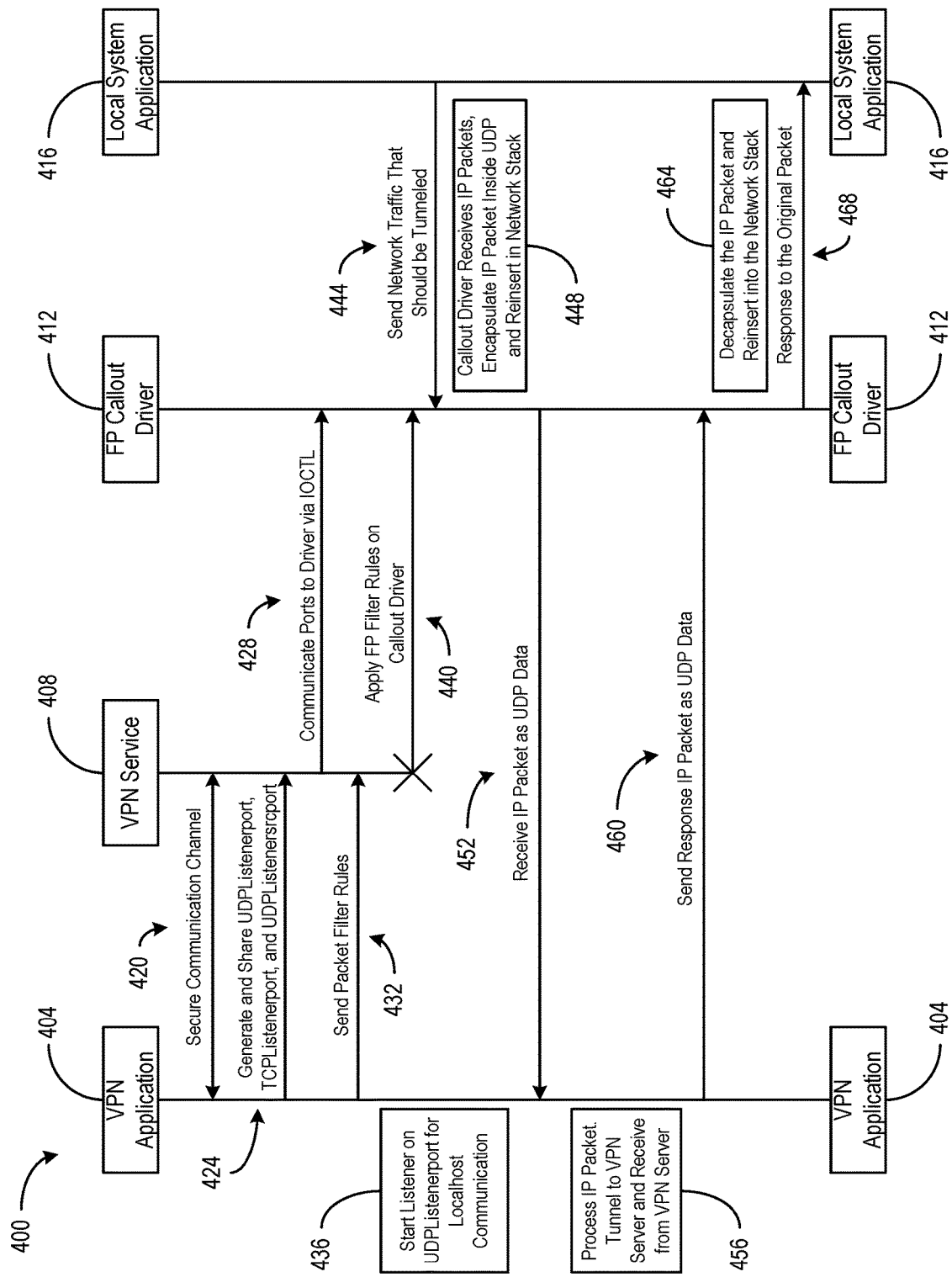
FIG. 4 is an example high-level workflow diagram for handling data packets, in accordance with one or more implementations.

FIG. 4 illustrates an example high-level workflow diagram 400 for handling data packets, in accordance with one or more implementations. Example operations described in illustration 400 can be executed, performed, or otherwise carried out by one or more components of the system 300 (e.g., OS 301, NIC 302, network driver 303, application 304, VPN application 340, FP 336, etc.), the computer 101, the cloud computing environment 214, or any other computing devices described herein in conjunction with FIGS. 1A-2C. The illustration 400 can include at least a VPN application 404, a VPN service 408, a FP callout driver 412 (sometimes generally referred to as a FP or driver), and a local system application 416 (sometimes generally referred to as an application).

The VPN application 404 can include features or functionalities similar to the VPN application 340. The VPN service 408 can include features or functionalities similar to the VPN service discussed in conjunction with FIG. 3. The FP 412 can include features or functionalities of the FP 336 operating in the network driver 303. The application 416 can include features or functionalities of the application 304. The VPN application 404, VPN service 408, FP 412, and application 416 can be executed on the client device, such as on the OS 301 of the system 300. The components (e.g., VPN application 404, VPN service 408, FP 412, and application 416) can be executed to perform the features, functionalities, or operations discussed herein for tunneling packets from the application 416 to a VPN server.

At step 420, the VPN application 404 can establish a secure communication channel with the VPN service 408. The secure communication channel can be established via a named pipe. The VPN service 408 can include administrator privilege. By establishing the communication channel with the VPN service 408, the VPN application 404 can gain at least a portion of the administrator privilege to execute the operations discussed herein. The VPN application 404 can communicate information to the VPN service 408 via the established communication channel. The VPN application 404 can relay information to the FP 412 via the VPN service 408.

At step 424, the VPN application 404 can generate or create various sockets on free ports. For example, the VPN application 404 can create a first socket on a free port for communication with the driver (e.g., the FP 412). The socket used for communication with the FP 412 can be referred to as a UDP listener 348 socket at the UDP listener 348 port. The VPN application 404 can create a second socket on a different free port for maintaining TCP connections. The socket used for maintaining the TCP connections can be referred to as the TCP listener 344 socket at the TCP listener 344 port. In some cases, the VPN application 404 may bind a separate socket to a different free port used as a source port for UDP packets between the FP 412 and the VPN application 404. In some other cases, the VPN application 404 can use the UDP listener 348 port as the source port for the UDP packet communicating between the FP 412 and the VPN application 404.

In some implementations, the VPN application 404 can create different sockets on free ports based on different IP versions. For example, the IP versions can include at least IPv4 and IPv6. The VPN application 404 can create a first TCP listener 344 socket for IPv4 packets and a second TCP listener 344 socket for IPv6 packets. Accordingly, based on the IP version of individual packets, the destination port of the packet can be configured to at least one of the first or the second TCP listener 344 port, for example. The VPN application 404 can establish or create sockets for TCP packets to maintain the SYN numbers or messages between the VPN application 404 and other remote computing devices, for example.

The VPN application 404 can communicate or share the ports to the VPN service 408, such as the TCP listener 344 port and the UDP listener 348 port, among other ports for communication with the FP 412. The VPN application 404 can indicate or instruct the VPN service 408 to share the port information with one or more drivers, such as the FP 412. The VPN application 404 can communicate the ports to the VPN service 408 via the named pipe or the secure communication channel established between the VPN application 404 and the VPN service 408.

At step 428, the VPN service 408 can receive information on the ports shared by the VPN application 404. The VPN service 408 can be configured or instructed to relay information of the ports to at least the FP 412. Accordingly, in response to receiving the port information, the VPN service 408 can relay the information to the FP 412. In some cases, the VPN service 408 can relay the port information to other drivers of the network driver 303 in the OS 301. The VPN service 408 can relay the information (or other information) to the FP 412 over an IOCTL. For example, the IOCTL can transfer information from the memory of the system 300 to one or more hardware, software, or a combination of hardware and software components of the system 300 or other devices, in some cases.

At step 432, the VPN application 404 can send packet filter rules (sometimes referred to as filter policy or configurations) to the VPN service 408. The VPN application 404 can receive the configuration from the VPN server, or other remote computing devices. The VPN application 404 can transmit the filter rules to the VPN service 408 for installation on the FP 412. The filter rules can include or indicate at least one of various destination IP addresses, destination ports, source IP addresses, or source ports for filtering or capturing by the FP 412. The filter rules can include a separate configuration for packets with localhost as either the destination address or the source address. For example, based on the filter rules, the FP 412 may intercept packets having localhost as the destination or the source. In some cases, the FP 412 may not intercept or filter certain packets with localhost as the destination or the source based on the filter rules. In further example, the destination address and the localhost filter rules can be based at the outbound network layer.

At step 436, the VPN application 404 can initiate or start a listener on at least the UDP listener 348. By starting the listener on the UDP listener 348, the VPN application 404 can be configured to receive UDP packets from at least the FP 412. The VPN application 404 can wait for traffic relay from the FP 412 in response to receiving packets from at least applications 416, among other applications 304. Further, the VPN application 404 can initiate or start a listener on the TCP listener 344, among other ports. The VPN application 404 can receive TCP packets at the TCP listener 344 port.

At step 440, the VPN service 408 can apply the filter rules received from the VPN application 404 to the FP 412. Applying the filter rules can refer to installing the filter rules on the network driver 303, for example. As such, the FP 412 can proceed to capture packets of interest based on the filter rules provided by the VPN server or other remote computing devices.

At step 444, the application 416 can transmit traffic to the FP 412. For example, the application 416 can insert data into the network stack to construct a data packet for transmission to a destination based on the destination address and the destination port indicated in the header of the packet. Based on at least the destination address matching the filter rules, the FP 412 included in the network driver 303 can capture the packet from the application 416. The FP 412 can capture the packet at any layer within the network stack. The FP 412 can capture other network traffic configured to be tunneled based on the filter rules.

At step 448, the FP 412 can invoke at least one of the callout drivers. Invoking the callout driver can execute the capturing process of packets of interest. The FP 412 can execute or invoke the callout in response to detecting the header of the packet matching one of the filter rules. The FP 412 can encapsulate the captured packet for reinsertion into the network stack. The FP 412 can encapsulate the packet with the localhost as the destination address and the UDP listener 348 port as the destination port. The encapsulated header can use UDP for transmission to the VPN application 404. Accordingly, the FP 412 can insert the encapsulated packet into the network stack with the destination configured to the VPN application 404. Once inserted, the network stack can handle any fragmentation in the packet resulted from the encapsulation, for example.

At step 452, the VPN application 404 can receive the encapsulated packet from the FP 412. The VPN application 404 can receive the encapsulated packet at the UDP listener 348 port. The encapsulated packet can be a UDP packet, which may include other types of packets (e.g., TCP, IP, other types of packets) in the payload.

At step 456, the VPN application 404 can check for the source port of the encapsulated packet. For example, the source port can be set to the port of the FP 412 communicating with the VPN application 404. In another example, the source port can be set to the port of the application 416 transmitting the traffic. The VPN application 404 can compare the source port to a list of valid ports to determine whether the accept the packet for processing. If the packet is from a random user-mode process sending the packet to the UDP listener 348 over localhost, the VPN application 404 can ignore the packet. Otherwise, the VPN application 404 can process the packet for tunneling.

The VPN application 404 can process the encapsulated packet for tunneling. For example, the VPN application 404 can process the encapsulated packet by decapsulating the encapsulated packet. The decapsulation process can include at least removing the encapsulated header from the payload, where the payload can include the packet from the application 416. In this case, the VPN application 404 can forward the packet from the application 416 to the VPN server via the tunnel established between the VPN application 404 and the VPN server. The VPN application 404 can establish the VPN tunnel with the VPN server upon instantiation of the VPN application 404. In other cases, the VPN application 404 can transfer the encapsulated packet to the VPN server.

The VPN application 404 can transfer the packet to the VPN server using a proprietary protocol. For example, the proprietary protocol can differ from entities managing the VPN application 404 or the VPN server. The traffic from the VPN application 404 to the VPN server may not be captured by the FP 412. For example, the filter rules can instruct or indicate to the FP 412 not to capture packets with the destination address or destination port associated with the VPN server. In further example, the FP 412 may not capture packets with localhost as the source if the destination address is the VPN server. The VPN server can refer to a gateway virtual server, where the addresses or ports of the gateway virtual server may not be part of the filter rules.

The VPN application 404 can receive a response from the VPN server. The response can be directed to the VPN application 404, such as with the destination address and the destination port associated with the VPN application 404. The VPN 404 can relay the response packet to the application 416 initiating the traffic in response to receiving the response packet from the VPN server. For example, the VPN application 404 can utilize loopback and modification of the packet header (e.g., TCP or IP headers). The modification of the headers can be described in further detail or in addition to the operations discussed herein in conjunction with FIG. 5.

In further example, the VPN application 404 can encapsulate the response from the VPN server in another UDP packet (sometimes referred to as a response UDP packet). The response packet can be the data or payload of the UDP packet. In some cases, the UDP packet can include an encapsulated header having the destination address and the destination port associated with the application 416 and the source port associated with a server responding to the traffic. The server in this case can be the VPN server or a different server that received the traffic relayed from the VPN server. In another case, the encapsulated header can include the destination address and the destination port associated with the FP 412. The VPN application 404 can modify the header of the response packet, such as to the destination port and destination address associated with the application 416 and the destination port and destination address associated with one of the servers handling the traffic from the application 416.

At step 460, the VPN application 404 can send the response packet to the FP 412. The response packet can include or be a UDP packet. The response packet can include or be an encapsulated packet encapsulating the response packet from the VPN server as the data of the UDP packet, for example. The VPN application 404 can send the response packet to the FP 412 in response to receiving a response from the VPN server. In some cases, the VPN application 404 can transmit the response packet in response to encapsulating the response from the VPN server in a UDP packet.

At step 464, the FP 412 can intercept the response packet transmitted by the VPN application 404. The response packet can include, for example, at least a destination port matching the filter rules. The FP 412 can decapsulate the packet (e.g., UDP packet) to retrieve or fetch the IP packet from the payload of the encapsulated packet. The fetched packet including a header having a destination port and a destination address associated with the application 416. The FP 412 can insert the fetched packet into the network stack.

At step 468, the FP 412 can provide a response to the original packet transmitted from the application 416. For example, the FP 412 can relay the response packet from the VPN server to the application 416. The FP 412 can provide the response to the application 416 responsive to inserting the fetched packet into the network stack with the destination address and destination port associated with the application 416. Accordingly, the application 416 can seamlessly receive the response from one of the remote computing devices, for example, appearing as if the original packet was transmitted directly to the server handling the traffic. For example, the response to the original packet can include a header having the source port and the source address of the remote computing device serving the traffic.

Figure 5:
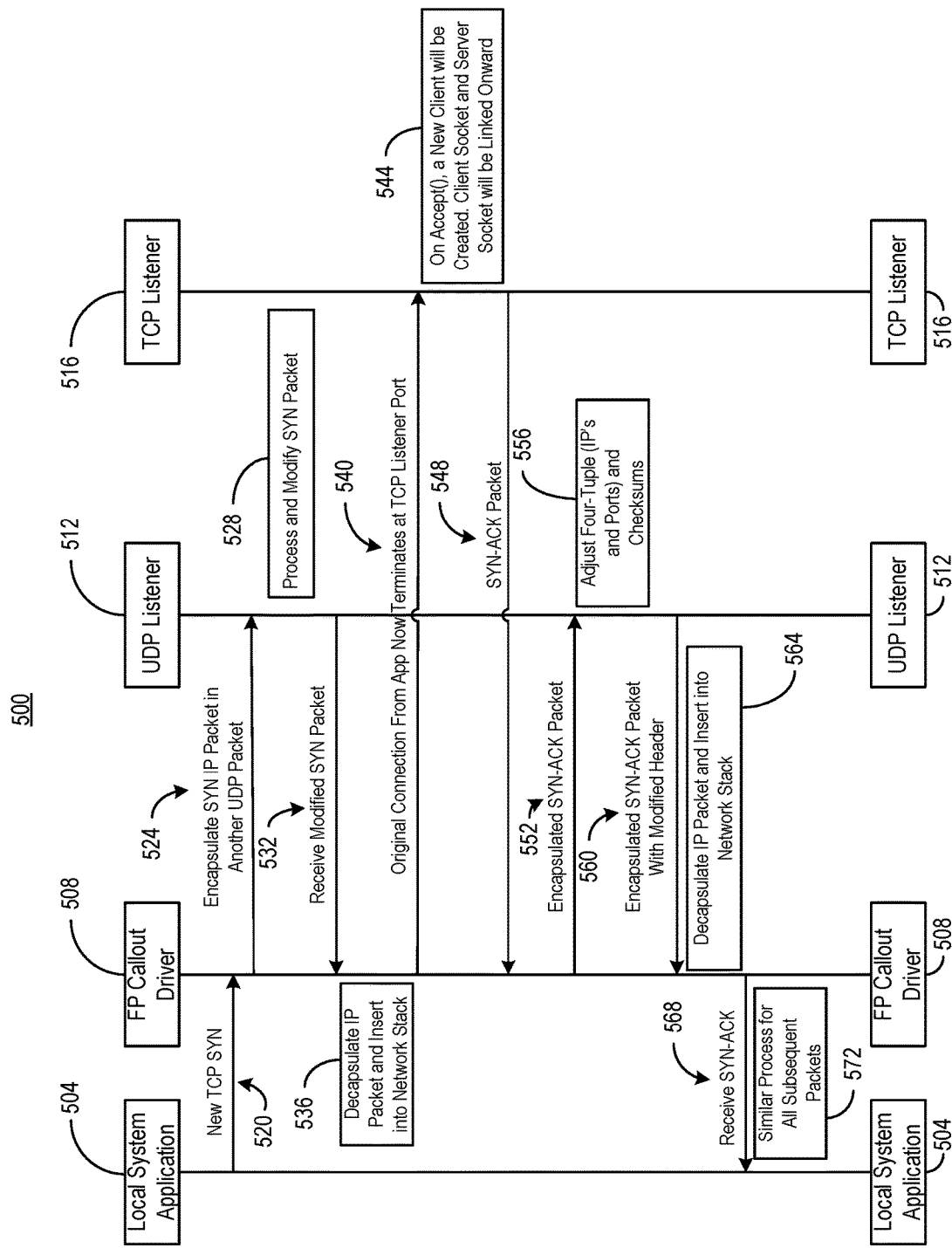
FIG. 5 is an example workflow diagram for handling TCP data packets, in accordance with one or more implementations.

FIG. 5 illustrates an example workflow diagram for handling TCP data packets, in accordance with one or more implementations. Example operations described in illustration 500 can be executed, performed, or otherwise carried out by one or more components of the system 300 (e.g., OS 301, NIC 302, network driver 303, application 304, VPN application 340, FP 336, etc.), the computer 101, the cloud computing environment 214, or any other computing devices described herein in conjunction with FIGS. 1A-2C. The illustration 500 can include at least a local system application 504 (sometimes generally referred to as an application), a FP callout driver 508 (sometimes generally referred to as a FP or driver), a UDP listener 512, and a TCP listener 516. The operations discussed herein can be performed in conjunction with or in addition to the operations of FIG. 4.

The application 504 can include features or functionalities of at least the application 304 or the application 416. The application 504 can be any process where traffic originated, such as a browser, putty client, among other client applications. The FP 508 can include features or functionalities of the FP 336 operating in the network driver 303 or the FP 412. The UDP listener 512 can include features and functionalities of the UDP listener 348. The TCP listener 516 can include features or functionalities of the TCP listener 344. The UDP listener 512 and the TCP listener 516 can be a part of the VPN application 340 (or VPN application 404 sometimes referred to as user-mode VPN client application). The UDP listener 512 and the TCP listener 516 can perform the operations discussed herein as performed generally by the VPN application 340. Further, one or more features and functionalities performed by the UDP listener 512 or the TCP listener 516 can be a part of the operation of the configurator 352, for example. The application 504, FP 508, UDP listener 512, and TCP listener 516 can be executed on the client device, such as on the OS 301 of the system 300. The components (e.g., application 504, FP 508, UDP listener 512, and TCP listener 516) can be executed to perform the features, functionalities, or operations discussed herein for tunneling packets from the application 504 to a VPN server.

At step 520, the application 504 can insert SYN data into a network stack for generating a SYN packet (sometimes referred to as TCP packet). The SYN packet can include a destination address matching a filter rule. In this example, the SYN packet from the application 504 can be configured with a destination address for tunneling to a VPN server. The SYN packet can include or be a part of a TCP packet. The operations discussed herein can be executed upon receiving TCP packets. At least some portions of the operation discussed herein can be used for tunneling other types of packets, such as UDP, IP, etc. The FP 508 can capture the SYN packet inserted into the network stack.

At step 524, the FP 508 can encapsulate the SYN packet in a UDP packet. The SYN packet can be included as a payload of the UDP packet. In this case, the UDP packet can include an encapsulated header having the destination port and destination address associated with the UDP listener 512. The FP 508 can transmit the UDP packet with the SYN packet to the UDP listener 512.

At step 528, the VPN application 340 (or VPN application 404) can process and modify the SYN packet from the FP 508. For example, responsive to receiving the UDP packet from the FP 508, the VPN application 340 can decapsulate the UDP packet to fetch the SYN packet from the application 504. The VPN application 340 can hold the SYN packet in the memory of the computing device (e.g., system 300). The VPN application 340 can create a new socket on a free port. The VPN application 340 can send at least one metadata request to the VPN server with the backend IP address of the system 300 and port of the VPN application on the new socket. The VPN server can wait for responses from the VPN server. Upon receiving responses from the VPN server (e.g., 200 OK responses), the VPN application can create a map of the original four-tuple against the source port ("srcport") of the SYN packet. Mapping the original four-tuple against the source port can refer to storing (e.g., in a table or an array) the four-tuple in association or link to the source port of the SYN packet. In some cases, the VPN application 340 can also map the four-tuple to the source address of the SYN packet. The four-tuple can refer to the source and destination addresses and ports of individual packets.

In further example, the VPN application 340 can modify the destination port ("Destport") in the SYN packet to the TCP listener 516 and the destination address to localhost in response to mapping the original four-tuple against the source port. For example, the VPN application 340 can modify the SYN packet in the payload of the encapsulated UDP packet. In another example, the VPN application 340 can encapsulate the modified SYN packet (sometimes referred to as modified TCP packet) in another UDP packet. In some cases, modifying the packet can refer to modifying the encapsulated packet. By modifying the destination port and the destination address in this case, the VPN application 340 can direct the modified SYN packet to the TCP listener 516. The modified SYN packet can refer to the SYN packet with the modified header. In response to modifying the destination port and destination address, the UDP listener 512 can transmit the modified SYN packet to the FP 508 by inserting the packet into the network stack. The FP 508 can capture the modified SYN packet based on the filter rules.

In some implementations, the VPN application 340 can change the destination IP address of the SYN packet. In some other implementations, the VPN application 340 can change the checksums of the SYN packet. For example, the checksums can be based on at least the destination port of the packet. The recipient can calculate the checksum based on the input received at the recipient side. In this example, the input can include at least the source port of the packet. The recipient can compare the checksum included in the packet to the calculated checksum to identify any data corruption, among other inconsistencies in original data and the received data, for example.

At step 532, the FP 508 can receive the modified SYN packet by capturing the packet from one of the layers in the network stack. At step 536, the FP 508 can decapsulate and fetch the modified SYN packet from the encapsulated packet (e.g., the UDP packet). The FP 508 can insert the modified SYN packet into the network stack having the TCP listener 516 as the destination port.

At step 540, the TCP listener 516 can receive the modified SYN packet from the FP 508. The VPN application 340 can terminate the original connection from the application 504 at the TCP listener 516. For example, VPN application 340 can terminate the original connection in response or concurrent to the TCP listener 516 receiving the modified SYN packet.

At step 544, the listener on the TCP listener 516 port can call the accept function, which can be denoted as accept( ). The accept function can be used to accept a new connection on a socket. The VPN application 340 can obtain or create a corresponding socket for accepting the new connection based on the SYN packet. The corresponding socket can include or be referred to as a client socket. The VPN application 340 can link the client socket to a gateway socket (e.g., a socket of the VPN server). Accordingly, the VPN application 340 can communicate with the VPN server via the established link between the client socket and the VPN server socket.

The VPN application 340 can transmit the SYN packet to the VPN server. The VPN server can respond to the VPN application 340 via the established client socket. The response from the VPN server can include at least a SYN-ACK packet (sometimes referred to as a response packet), indicating an acknowledgment of receiving the SYN packet. The SYN-ACK packet can include a source address and a source port of the server responding to the traffic. The destination address and the destination port of the SYN-ACK packet can be associated with the VPN application 340 and the TCP listener 516 port, for example. In some cases, the SYN-ACK packet can include a destination address and a destination port associated with the application 504 or other addresses or ports listed in the filter rules.

At step 548, the TCP listener 516 can insert the SYN-ACK into the network stack. The SYN-ACK can include at least a destination port matching one of the filter rules. Accordingly, the FP 508 can capture the SYN-ACK packet from the TCP listener 516.

At step 552, the FP 508 can encapsulate the SYN-ACK packet from the TCP listener 516. The encapsulated SYN-ACK packet can include an encapsulated header having at least a localhost destination address and UDP listener 512 as the destination port. The FP 508 can perform step 552 for any packet from the TCP listener 516. The FP 508 can insert the encapsulated SYN-ACK packet into the network stack for transmission to the UDP listener 512.

At step 556, the VPN application 340 can adjust the four-tuple of the SYN-ACK packet. For example, the VPN application 340 can configure at least the destination port of the SYN-ACK packet to the destination port and the destination address associated with the application 504. In another example, the VPN application 340 can refer to the original four-tuple mapped against the source port of the application 504. The VPN application 340 can modify the source port and source address of the SYN-ACK packet to the original destination port and destination address. Additionally, the VPN application 340 can modify the destination port and the destination address of the SYN-ACK packet to the original source port and source address. The VPN application 340 can retrieve the original four-tuple from the memory. The VPN application 340 can discard the original four-tuple responsive to retrieval and modification of the SYN-ACK packet. In some implementations, based on at least one of the modified IP addresses or ports, the VPN application 340 can adjust the checksums of the SYN-ACK packet.

At step 560, the VPN application 340 can encapsulate the modified SYN-ACK packet (sometimes referred to as a modified response packet) with the modified header. The modified header can include the ports and IP addresses based on the original four-tuple. The UDP listener 512 can insert the encapsulated modified SYN-ACK packet into the network stack. The destination port can be listed in the filter rules for the FP 508 to capture.

At step 564, the FP 508 can capture the encapsulated modified SYN-ACK packet. The FP 508 can decapsulate the encapsulated packet to fetch the modified SYN-ACK packet. The FP 508 can fetch the SYN-ACK packet from the payload of the encapsulated packet. Accordingly, the FP 508 can insert the modified SYN-ACK packet into the network stack having ports and address of the application 504 as the destination.

At step 568, the application 504 can receive the SYN-ACK packet from the FP 508. By receiving the SYN-ACK packet, the application 504 can determine that the destination server received the original SYN packet sent from the application 504. At step 572, similar processes or operations discussed herein can be performed by the components (e.g., application 504, FP 508, UDP listener 512, or TCP listener 516) for subsequent packets.

Figure 6:
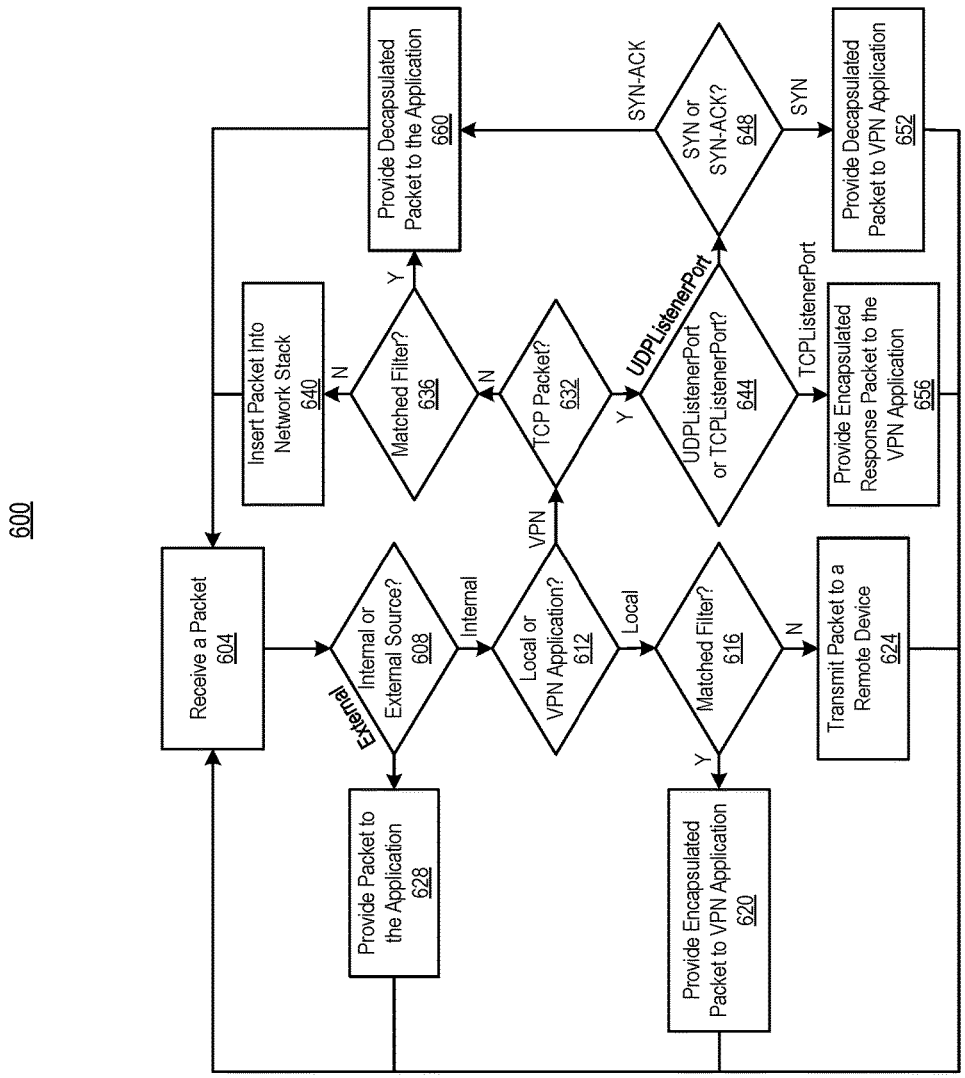
FIG. 6 is an example flow diagram of a method for tunneling data packets to a server, in accordance with one or more implementations.

FIG. 6 illustrates an example flow diagram of a method 600 for tunneling data packets to a server. The example method 600 can be executed, performed, or otherwise carried out by one or more components of the system 300 (e.g., OS 301, NIC 302, network driver 303, application 304, VPN application 340, FP 336, etc.), the computer 101, the cloud computing environment 214, or any other computing devices described herein in conjunction with FIGS. 1A-2C. The method 600 can include receiving a packet, at step 604. At step 608, the method 600 can include determining whether a packet is from an internal or external source. At step 612, the method 600 can include determining whether the packet is from a local application or a VPN application. At step 616, the method 600 can include determining whether the packet matches a filter. At step 620, the method 600 can include providing an encapsulated packet to a VPN application. At step 624, the method 600 can include transmitting a packet to a remote device. At step 628, the method 600 can include providing a packet to an application. At step 632, the method 600 can include determining whether the packet is a TCP packet. At step 636, the method 600 can include determining whether the packet matches a filter rule. At step 640, the method 600 can include inserting the packet into a network stack. At step 644, the method 600 can include determining whether the packet is received from the UDP listener port or the TCP listener port. At step 648, the method 600 can include determining whether the packet is a SYN or SYN-ACK packet. At step 652, the method 600 can include providing the decapsulated packet to the VPN application. At step 656, the method 600 can include providing the encapsulated response packet to the VPN application. At step 660, the method 600 can include providing a decapsulated packet to the application.

Still referring to FIG. 6 in further detail, at step 604, the network service (e.g., FP 336) can receive a packet from one or more components of the system or client device, such as one of the various applications or the VPN application installed on the client device. In some cases, other components of the client device can receive one or more packets from a different component. For example, the VPN application can receive a packet from the network service. The VPN application can receive a packet from the VPN server via an established socket between the VPN application and the VPN server. In another example, the application can receive a packet from the network service. Upon at least one component of the client device receiving a packet, other steps can be performed as discussed herein.

For the purposes of providing examples, the logical operations discussed in ACTS 604-668 can be performed by the network service in conjunction with other components of the client device. For example, the network service can receive a packet from an application executed by the processor of a client device. The packet can be configured for transmission via a VPN tunnel. The packet can include at least a source address of the client device (or computing device) and the source port associated with the application. In further example, at the end of or concurrent to one or more operations discussed herein, the network service can process other packets, such as after step 620, 624, 628, 640, 652, 656, and 660. The received packet can be a response packet, an encapsulated packet, a decapsulated packet, etc.

At step 608, the method 600 can include determining whether a packet is from an internal or external source. An internal source can refer to hardware, software, or a combination of hardware and software components within the client device. For example, the internal component can include or be referred to by an IP address of a localhost address. Receiving a packet from an internal source can include at least packets from an application, a VPN application, or a network service. An external source can refer to hardware, software, or a combination of hardware and software components external to the client device. For example, the external component can include or be referred to by an IP address that is not a localhost address. For example, the VPN application can transmit a packet to an external source by including an IP address associated with and unique to the external computing device.

The decision blocks of at least ACTS 608, 612, 616, 632, 636, 644, and 648 can be performed by the network service or other components of the client device. In some cases, the decision blocks can be a general guideline for describing features and functionalities of one or more components of the OS executed based on the received packet. For example, determining whether the sender (e.g., the source) is an internal source or an external source can be provided to describe how the network service handles packets having different source IP addresses or source ports. In another example, the network service can perform step 616 to determine whether the packet matches a filter rule. In yet another example, the determination of whether the packet is received from an application (e.g., local application) or a VPN application (e.g., local VPN application) can be a guideline for how the network service process different types of packets.

At step 612, the method 600 can include determining whether the packet is from a local application or a VPN application. If the packet is from a local application, the network service can proceed to step 616. If the packet is from a local VPN application, proceed to step 632. The VPN application can be instantiated for the operations discussed herein. By instantiating the VPN application, the VPN application can establish a VPN tunnel with a remote computing device between one or more sockets of the VPN application and the remote computing device. The remote computing device can include or refer to the VPN server. Further, the VPN application can provide or identify one or more ports (e.g., UDP listener port and TCP listener port) for communication with the network service. The VPN application can provide its port information to the network service to receive packets from the network service. The VPN application can provide packet filtering policies (sometimes referred to as filter rules or tunnel filters) to the FP via a VPN plugin. The VPN application can communicate with the VPN plugin via a named pipe. Accordingly, the network service can receive at least an identification of the destination port from the VPN application and the filter rules. The filter rules can be from the VPN server in communication with the VPN application.

At step 616, the method 600 can include determining whether the packet matches a filter. The network service can compare at least the destination port to one or more filter rules. In some implementations, the network service can compare other ports, IP addresses, or other information included in the packet to the one or more filter rules. In some cases, the filter rules can indicate the type of information to compare from the packet. If the packet matches a filter rule, proceed to step 620. Otherwise, proceed to step 624.

At step 620, the method 600 can include providing an encapsulated packet to a VPN application. For example, responsive to determining that the packet matches the filter rule, the network service can encapsulate the packet from the application in a different packet. The encapsulated packet can use UDP (e.g., UDP packet) to encapsulate the original packet into the payload, for example. The encapsulated packet can include a header including a localhost destination address and a destination port associated with the VPN application. In this case, the destination port can be a UDP listener port. Subsequent to encapsulating the original packet, the network service can provide the encapsulated packet to the VPN application by inserting the encapsulated packet into the network stack.

The VPN application can receive the encapsulated packet from the network service. The VPN application can transmit the encapsulated packet to the remote device via the VPN tunnel. In this case, the network service may not capture the packet through the VPN tunnel, as information associated with the VPN tunnel, such as the destination port associated with the VPN tunnel may not be included in the filtering rules.

The VPN application can receive a response packet from the remote device via the VPN tunnel. The response packet can be encapsulated with a header including a source port associated with the VPN application. The encapsulation can be done by the remote computing device. In some cases, the VPN application can encapsulate the response packet with the encapsulated header. The VPN application can provide the encapsulated response packet to the network service. The network service, upon receiving the response packet, can decapsulate the response packet and provide the decapsulated response packet to the application of the client device that sent the original packet. The process for decapsulating the response packet can be discussed in further detail in step 660, for example.

At step 624, the method 600 can include transmitting a packet to a remote device. For example, the network service can determine that the packet does not match any filter rule. Accordingly, the network service may not capture or intercept the packet or data processed through the network stack. In some cases, if captured, the network service can reinsert the data packet back into the network stack without modifying the packet. Accordingly, in this case, the packet from the application can be sent directly to the original destination.

At step 628, the method 600 can include providing a packet to an application. Further from step 624, the network service can receive a response from an external source, such as a remote computing device different from a VPN server. In this case, the network service can identify the packet sent directly from the remote device not through the VPN application. The network service can determine to provide the packet to the application upon detecting that the packet is directly from the remote device indicating the out-going packet was not filtered. In this case, the network service may not capture the packet or the network service can reinsert the packet without modification. Accordingly, the application can receive the packet from the remote device outside of the filter rules.

At step 632, the method 600 can include determining whether the packet is a TCP packet. The TCP packet can refer to the type of the original packet sent from the application. Processing the TCP packet can be different or include additional steps from other packets, such as UDP packets, IP packets, etc., as described in at least FIGS. 4-5. If the packet is a TCP packet, proceed to step 644. Otherwise, proceed to step 636. In proceeding to step 644, the operations described in ACTS 644-660 can assume that the packet from the application matches one of the filter rules assigned or identified by the VPN server.

At step 636, the method 600 can include determining whether the packet matches a filter rule. For example, the network service can receive a packet from the VPN application subsequent to transmitting the encapsulated packet to the VPN application (e.g., step 620). In this case, the packet from the VPN application can be a response packet from the VPN server or the remote computing device. The network service can receive the response packet including an encapsulated header. The encapsulated header can include a source address and a source port associated with the VPN application. The network service can determine whether the response packet from the VPN application matches another filter rule, for example, based on the source address or the source port. In some cases, the network service can compare other addresses or ports, such as the destination address or the destination port to the response packet from the VPN application to the filtering rule.

If the packet matches the filter rule, the network service can proceed to step 660. For example, the network service can decapsulate the encapsulated response packet or remove the encapsulated header to fetch the response packet. The network service can insert the response packet having the original four-tuple of the application into the network stack. For example, the network service can change the original destination address and destination port to the source address and the source port of the response packet. Likewise, the network service can change the original source address and source port to the destination address and the destination port. If the encapsulated response packet does not match the filter, proceed to step 640.

At step 640, the method 600 can include inserting the packet into a network stack. For example, if the packet does not match the filter, the network service may not capture or intercept the packet. In some cases, the network service can reinsert the packet into the network stack responsive to determining that the packet does not match the filter. Inserting the packet into the network stack can allow the client device to forward the packet to the corresponding recipient based on at least the destination port and the destination address.

At step 644, the method 600 can include determining whether the packet is received from the UDP listener port or the TCP listener port. In the operations discussed herein, the packet can be assumed to match one or more filters set by the VPN server. For example, the network service can capture one or more packets discussed in at least ACTS 652, 656, or 660 to provide the packets to their destination. The network service upon capturing the individual packets can modify at least the ports and addresses included in the header or in the encapsulated packet. If the packet is from the UDP listener port of the VPN application, proceed to step 648. If the packet is from the TCP listener port of the VPN application, proceed to step 656.

At step 648, the method 600 can include determining whether the packet is a SYN or SYN-ACK packet. A SYN packet can include or refer to a packet requesting establishment of a connection. A SYN-ACK packet can include or refer to the response from the remote computing device to the SYN packet. The response can be from the VPN server or a different remote device routed to by the VPN server. In this case, the SYN packet can include or refer to the modified SYN packet from the UDP listener port. Further, the SYN-ACK packet can refer to a modified SYN-ACK packet from the UDP listener port.

For example, the network service can receive a new TCP SYN packet from the application. The network service can capture the SYN packet based on a match with a filter rule. The network service can encapsulate the SYN packet in a UDP packet and transmit the encapsulated SYN packet to the VPN application via the UDP listener port, e.g., similar to step 620. The VPN application can process and modify the encapsulated SYN packet. For example, the VPN application can at least modify the destination port to the TCP listener port and the IP to localhost, and maintain the original four-tuple of the SYN packet mapped against the original source port of the application.

The network service can receive the modified SYN packet from the VPN application. The destination of the modified SYN packet can be set or modified to the TCP listener port. Accordingly, the network service can proceed to step 652 based on receiving the modified SYN packet from the VPN application via the UDP listener port.

At step 652, the method 600 can include providing the decapsulated packet to the VPN application. The features and functionalities of step 652 can include or be similar to step 620 in some aspects. For example, the network service can receive the modified SYN packet from the VPN application. The network service can decapsulate the modified SYN packet having the encapsulated header. By decapsulating or removing the header, the network service can fetch the modified SYN packet. The network service can insert the packet into the network stack for sending the SYN packet to the TCP listener port of the VPN application. In this case, the UDP listener port can refer to a first destination port and the TCP listener port can refer to a second destination port.

The VPN application can provide the modified SYN packet to the VPN server (e.g., remote computing device) via a VPN tunnel. The VPN server may accept the request and create a new client, such that the client socket and the server socket can be linked. Accordingly, the VPN application establish the connection for communication between the application and the VPN server. The VPN application can receive a response from the VPN server acknowledging the connection. The response can be in the form of SYN-ACK packet. The VPN application can insert, using the TCP listener port, the SYN-ACK packet into the network stack which can be captured by the network service. Accordingly, the network service can proceed to step 656, since the packet is received from the TCP listener port.

At step 656, the method 600 can include providing the encapsulated response packet to the VPN application. The network service can receive the encapsulated response (e.g., SYN-ACK) packet from the VPN application at the TCP listener port. The response packet can be in response to the modified version of the TCP packet (e.g., modified SYN packet). The response packet can include at least the localhost destination address and the destination port associated with the VPN application.

The network service can encapsulate the response packet, which can be referred to herein as an encapsulated response packet. The network service can provide the response packet to the VPN application. The encapsulated response packet can include the UDP listener port as the destination port and the localhost as the destination address. The network service can transmit the encapsulated response packet to the VPN application for processing prior to transmitting the response to the original application (e.g., step 660).

Responsive to receiving the encapsulated response packet from the network service, the VPN application can adjust the four-tuple of the response packet. In some cases, the VPN application can adjust the checksum of the response packet based on the adjusted four-tuple. For example, the VPN application can retrieve the original four-tuple mapped against the source port of the application. The VPN application can reverse the original source and destination port and address. Accordingly, the VPN application can transmit an encapsulated response packet with the modified header to the network stack using the UDP listener port.

Referring back to step 648, the SYN-ACK packet can refer to the encapsulated response packet with the modified header. In this case, the SYN-ACK packet can include or refer to the modified response packet. Following the operations of at least step 644 and 648, the network service can proceed to step 660 upon receiving the encapsulated modified response packet from the UDP listener port.

At step 660, the method 600 can include providing a decapsulated packet to the application. The network service can decapsulate the encapsulated modified response packet. Hence, the network service can fetch the modified response packet by removing the encapsulated header. The network service can provide the decapsulated packet (e.g., decapsulated modified response packet) to the application via insertion into the network stack. Accordingly, the application can receive the response packet from the network service having a destination port and destination address associated with the application and the source port and source address associated with the original destination port and destination address, for example. In some cases, the source port and source address can be associated with the VPN server.

Similarly, referring back to step 636, the network service can provide other decapsulated response packets (e.g., non-TCP packets) to the application. The network service can provide the response packet in response to receiving the response packet from the VPN application, in the case of non-TCP packets. The network service can remove any encapsulated header from the encapsulated response packet to send to the application. The features or functionalities of individual operations can be discussed in conjunction with, in addition to, or as part of the features of the components in at least FIGS. 3-5.

Further Example Embodiments

The following examples pertain to further embodiments, from which numerous permutations and configurations will be apparent.

Example 1 includes a method including receiving by a network service executed by a processor of a computing device, a packet from an application executed by the processor for transmission via a virtual private network (VPN) tunnel, the packet comprising a source address of the computing device and a source port associated with the application; determining, by the network service, that the packet matches a first tunnel filter, responsive to the determination that the packet matches the first tunnel filter, encapsulating, by the network service, the packet with a header comprising a localhost destination address and a destination port associated with a local VPN application executed by the processor; and providing, by the network service, the encapsulated packet to the local VPN application.

Example 2 includes the subject matter of Example 1, wherein the local VPN application transmits the encapsulated packet via the VPN tunnel to a remote computing device.

Example 3 includes the subject matter of any of Examples 1 and 2, receiving, by the network service, a second packet from the local VPN application, the second packet including an encapsulated header comprising a source address and a source port associated with the local VPN application; determining, by the network service, that the second packet matches a second tunnel filter; responsive to the determination that the second packet matches the second tunnel filter, removing, by the network service, the encapsulated header from the second packet; and providing, by the network service, the decapsulated second packet to the application.

Example 4 includes the subject matter of any of Examples 1 through 3, further comprising receiving an identification of the destination port from the local VPN application upon instantiation, by the processor, of the local VPN application.

Example 5 includes the subject matter of any of Examples 1 through 4, wherein the encapsulated header uses a user datagram protocol (UDP).

Example 6 includes the subject matter of any of Examples 1 through 5, wherein the packet comprises a transport control protocol (TCP) packet.

Example 7 includes the subject matter of any of Examples 1 through 6, receiving, by the network service, a modified version of the TCP packet from the local VPN application comprising the localhost destination address and a second destination port associated with the local VPN application; removing, by the network service, the encapsulated header from the modified version of the TCP packet; and providing, by the network service, the modified version of the TCP packet to the local VPN application via the second destination port.

Example 8 includes the subject matter of any of Examples 1 through 7, further comprising: receiving, by the network service from the local VPN application, a response packet to the modified version of the TCP packet, the response packet comprising the localhost destination address and the destination port associated with the local VPN application; and providing, by the network service, the response packet to the local VPN application.

Example 9 includes the subject matter of any of Examples 1 through 8, receiving, by the network service from the local VPN application, a modified version of the response packet comprising a second source port associated with the local VPN application; encapsulating, by the network service, the modified version of the response packet with the header comprising the localhost destination address and the destination port associated with the local VPN application; and providing, by the network service, the encapsulated packet to the local VPN application, the local VPN application transmitting the encapsulated packet via the VPN tunnel to a remote computing device.

Example 10 includes a method including establishing, by virtual private network (VPN) application executed by a processor of a computing device, a VPN tunnel with a remote computing device; identifying, by the VPN application to a network service executed by the processor, a first listening port and a packet filter policy; receiving, by the VPN application from the network service, a packet from a local application of the computing device encapsulated with a header comprising a localhost destination address and a destination port comprising the first listening port, the packet encapsulated and transmitted by the network service responsive to matching the packet filter policy; and transmitting, by the VPN application, the encapsulated packet to the remote computing device via the VPN tunnel.

Example 11 includes the subject matter of Example 10, receiving, by the VPN application, a response packet via the VPN tunnel from the remote computing device, the response packet encapsulated with a header comprising a source port associated with the VPN application; and providing, by the VPN application, the encapsulated response packet to the network service, the network service decapsulating the response packet and providing the decapsulated response packet to the local application of the computing device.

Example 12 includes the subject matter of any of Examples 10 and 11, wherein the encapsulated header of the response packet comprises the source port associated with the VPN application.

Example 13 includes the subject matter of any of Examples 10 through 12, wherein the encapsulated header uses a user datagram protocol (UDP).

Example 14 includes the subject matter of any of Examples 10 through 13, wherein the packet comprises a transport control protocol (TCP) packet.

Example 15 includes a system including a computing device comprising a processor and a network interface, wherein the processor is configured to execute a network service, a local application, and a virtual private network (VPN) application; and wherein the network service is configured to: receive a packet from the local application for transmission via a VPN tunnel, the packet comprising a source address of the computing device and a source port associated with the local application, determine that the packet matches a first tunnel filter, responsive to the determination that the packet matches the first tunnel filter, encapsulate the packet with the header comprising a localhost destination address and a destination port associated with the VPN application, and provide the encapsulated packet to the VPN application.

Example 16 includes the subject matter of Example 15, wherein the VPN application transmits the encapsulated packet via the VPN tunnel to a remote computing device.

Example 17 includes the subject matter of any of Examples 15 and 16, wherein the processor is further configured to: receive a second packet from the VPN application, the second packet including an encapsulated header comprising a source address and a source port associated with the VPN application; determine that the second packet matches a second tunnel filter; responsive to the determination that the second packet matches the second tunnel filter, remove the encapsulated header from the second packet; and provide the decapsulated second packet to the local application.

Example 18 includes the subject matter of any of Examples 15 through 17, wherein the processor is further configured to receive an identification of the destination port from the VPN application upon instantiation, by the processor, of the VPN application.

Example 19 includes the subject matter of any of Examples 15 through 18, wherein the encapsulated header uses a user datagram protocol (UDP).

Example 20 includes the subject matter of any of Examples 15 through 19, wherein the packet comprises a transport control protocol (TCP) packet; and wherein the processor is further configured to: receive a modified version of the TCP packet from the VPN application comprising the localhost destination address and a second destination port associated with the VPN application; remove the encapsulated header from the modified version of the TCP packet; and provide the modified version of the TCP packet to the VPN application via the second destination port.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method, comprising:
receiving, by a network service executed by a processor of a computing device, a packet from an application executed by the processor for transmission via a virtual private network (VPN) tunnel, the packet comprising a source address of the computing device and a source port associated with the application;
determining, by the network service, that the packet matches a first tunnel filter;
responsive to the determination that the packet matches the first tunnel filter, encapsulating, by the network service, the packet with a header comprising a localhost destination address and a destination port associated with a local VPN application executed by the processor, an identification of the destination port received from the local VPN application upon instantiation, by the processor, of the local VPN; and
providing, by the network service, the encapsulated packet to the local VPN application.

2. The method of claim 1, wherein the local VPN application transmits the encapsulated packet via the VPN tunnel to a remote computing device.

3. The method of claim 1, further comprising:
receiving, by the network service, a second packet from the local VPN application, the second packet including an encapsulated header comprising a source address and a source port associated with the local VPN application;
determining, by the network service, that the second packet matches a second tunnel filter;
responsive to the determination that the second packet matches the second tunnel filter, removing, by the network service, the encapsulated header from the second packet; and
providing, by the network service, the decapsulated second packet to the application.

4. The method of claim 1, wherein the encapsulated header uses a user datagram protocol (UDP).

5. The method of claim 1, wherein the packet comprises a transport control protocol (TCP) packet.

6. The method of claim 5, further comprising:
receiving, by the network service, a modified version of the TCP packet from the local VPN application comprising the localhost destination address and a second destination port associated with the local VPN application;
removing, by the network service, the encapsulated header from the modified version of the TCP packet; and
providing, by the network service, the modified version of the TCP packet to the local VPN application via the second destination port.

7. The method of claim 6, further comprising:
receiving, by the network service from the local VPN application, a response packet to the modified version of the TCP packet, the response packet comprising the localhost destination address and the destination port associated with the local VPN application; and
providing, by the network service, the response packet to the local VPN application.

8. The method of claim 7, further comprising:
receiving, by the network service from the local VPN application, a modified version of the response packet comprising a second source port associated with the local VPN application; and
encapsulating, by the network service, the modified version of the response packet with the header comprising the localhost destination address and the destination port associated with the local VPN application; and
providing, by the network service, the encapsulated packet to the local VPN application, the local VPN application transmitting the encapsulated packet via the VPN tunnel to a remote computing device.

9. A method, comprising:
establishing, by virtual private network (VPN) application executed by a processor of a computing device, a VPN tunnel with a remote computing device;
identifying, by the VPN application to a network service executed by the processor, a first listening port and a packet filter policy;
receiving, by the VPN application from the network service, a packet from a local application of the computing device encapsulated with a header comprising a localhost destination address and a destination port comprising the first listening port, the packet encapsulated and transmitted by the network service responsive to matching the packet filter policy;
transmitting, by the VPN application, the encapsulated packet to the remote computing device via the VPN tunnel;
receiving, by the VPN application, a response packet via the VPN tunnel from the remote computing device, the response packet encapsulated with a header comprising a source port associated with the VPN application; and
providing, by the VPN application, the encapsulated response packet to the network service, the network service decapsulating the response packet and providing the decapsulated response packet to the local application of the computing device.

10. The method of claim 9, wherein the encapsulated header of the response packet comprises the source port associated with the VPN application.

11. The method of claim 9, wherein the encapsulated header comprises a user datagram protocol (UDP).

12. The method of claim 9, wherein the packet comprises a transport control protocol (TCP) packet.

13. A system, comprising:
a computing device comprising a processor and a network interface, wherein the processor is configured to execute a network service, a local application, and a virtual private network (VPN) application; and
wherein the network service is configured to:
receive a packet from the local application for transmission via a VPN tunnel, the packet comprising a source address of the computing device and a source port associated with the local application,
determine that the packet matches a first tunnel filter,
responsive to the determination that the packet matches the first tunnel filter, encapsulate the packet with the header comprising a localhost destination address and a destination port associated with the VPN application, an identification of the destination port received from the local VPN application upon instantiation, by the processor, of the local VPN, and
provide the encapsulated packet to the VPN application.

14. The system of claim 13, wherein the VPN application transmits the encapsulated packet via the VPN tunnel to a remote computing device.

15. The system of claim 13, wherein the processor is further configured to:
- receive a second packet from the VPN application, the second packet including an encapsulated header comprising a source address and a source port associated with the VPN application;
- determine that the second packet matches a second tunnel filter;
- responsive to the determination that the second packet matches the second tunnel filter, remove the encapsulated header from the second packet; and
- provide the decapsulated second packet to the local application.

16. The system of claim 13, wherein the encapsulated header uses a user datagram protocol (UDP).

17. The system of claim 13, wherein the packet comprises a transport control protocol (TCP) packet; and wherein the processor is further configured to:
- receive a modified version of the TCP packet from the VPN application comprising the localhost destination address and a second destination port associated with the VPN application;
- remove the encapsulated header from the modified version of the TCP packet; and
- provide the modified version of the TCP packet to the VPN application via the second destination port.

* * * * *